(12) United States Patent
Okuwaki

(10) Patent No.: US 9,096,219 B2
(45) Date of Patent: Aug. 4, 2015

(54) DRIVE APPARATUS FOR HYBRID VEHICLE

(75) Inventor: Shigeru Okuwaki, Gotemba (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/381,851

(22) PCT Filed: Mar. 2, 2012

(86) PCT No.: PCT/JP2012/055416
§ 371 (c)(1),
(2), (4) Date: Aug. 28, 2014

(87) PCT Pub. No.: WO2013/128639
PCT Pub. Date: Sep. 6, 2013

(65) Prior Publication Data
US 2015/0045179 A1    Feb. 12, 2015

(51) Int. Cl.
| B60K 17/356 | (2006.01) |
| B60K 1/02 | (2006.01) |
| B60K 6/365 | (2007.10) |
| B60K 6/387 | (2007.10) |
| B60K 6/445 | (2007.10) |
| B60W 20/00 | (2006.01) |
| B60W 10/06 | (2006.01) |
| B60K 6/442 | (2007.10) |
| B60W 10/18 | (2012.01) |
| B60W 10/08 | (2006.01) |
| B60W 10/02 | (2006.01) |
| B60W 10/12 | (2012.01) |
| B60K 6/38 | (2007.10) |

(52) U.S. Cl.
CPC ............. *B60W 20/10* (2013.01); *B60K 6/442* (2013.01); *B60K 6/445* (2013.01); *B60W 10/02* (2013.01); *B60W 10/06* (2013.01); *B60W 10/08* (2013.01); *B60W 10/12* (2013.01); *B60W 10/182* (2013.01); *B60K 1/02* (2013.01); *B60K 6/365* (2013.01); *B60K 17/356* (2013.01); *B60K 2006/381* (2013.01); *Y02T 10/6234* (2013.01); *Y02T 10/6239* (2013.01); *Y10S 903/93* (2013.01)

(58) Field of Classification Search
CPC ........ B60K 17/356; B60K 1/02; B60K 6/365; B60K 6/387; B60K 6/445
See application file for complete search history.

(56) References Cited

U.S. PATENT DOCUMENTS

| 6,886,648 | B1 | 5/2005 | Hata et al. | |
| 2007/0087894 | A1* | 4/2007 | Tsuneyoshi et al. | 477/3 |
| 2012/0196713 | A1* | 8/2012 | He et al. | 475/5 |

FOREIGN PATENT DOCUMENTS

JP    3402236 B2    5/2003

* cited by examiner

*Primary Examiner* — Tisha Lewis
(74) *Attorney, Agent, or Firm* — Sughrue Mion, PLLC

(57) ABSTRACT

The drive apparatus (1) controls a rotating speed of a ring gear (Ri) of a power split mechanism (6) by controlling a first motor generator (3) after a rotating speed of an engine (2) is deemed to be zero by executing an engine stop control for stopping the engine (2), when a condition which a control to a clutch (31) or a parking mechanism (30) is performed is satisfied while the engine (2) is running.

7 Claims, 20 Drawing Sheets

FIG.2

| SHIFT POSITION | PARKING MECHANISM | CLUTCH | DRIVE MODE |
|---|---|---|---|
| P | ON | ON | — |
| R | ON | OFF | SERIES HYBRID MODE |
| N | Same States before Neutral Position is Selected | | — |
| D | OFF | ON | SERIES-PARALLEL HYBRID MODE |

R

DRIVE APPARATUS FOR HYBRID VEHICLE

CROSS REFERENCE TO RELATED APPLICATIONS

This application is a National Stage of International Application No. PCT/JP2012/055416 filed Mar. 2, 2012, the contents of all of which are incorporated herein by reference in their entirety.

TECHNICAL FIELD

The present invention relates to a drive apparatus for a hybrid vehicle having an internal combustion engine and an electric motor as driving sources for traveling.

BACKGROUND ART

There is known a drive apparatus for a vehicle where an engine is connected to a carrier of a planetary gear mechanism, a first motor generator is connected to a sun gear of the planetary gear mechanism, an output shaft is connected to a ring gear of the planetary gear mechanism, and a second motor generator is connected to the output shaft, and the drive apparatus has a clutch which intervenes between the planetary gear mechanism and the second motor generator and which engages and disengages a power transmission of the output shaft, and a brake being allowed to switch a stop of the ring gear connected to the output shaft and a release of the ring gear (see Patent Literature 1). By operating the clutch and the brake appropriately, the drive apparatus is allowed to switch drive modes between a series hybrid mode where all of power of the engine is converted to electric power by the first motor generator and the second motor generator is driven by the electric power, and a series-parallel hybrid mode where the power of the engine is split into two powers by the planetary gear mechanism and a first power is converted to electric power by the first motor generator and the second motor generator is driven by the electric power while a second power is transmitted to the output shaft.

CITATION LIST

Patent Literature

Patent Literature 1: JP-3402236-B

SUMMARY OF INVENTION

Technical Problem

In the drive apparatus of the Patent Literature 1, a reverse drive of the vehicle is executed in the series hybrid mode. Thereby, for example, when a reverse position is selected as a shift operation in a state that a drive position is selected and the series-parallel hybrid mode is executed, it is necessary to change the drive mode from the series-parallel hybrid mode to the series hybrid mode. The series-parallel hybrid mode is realized by an operation for making the brake go into a release state and an operation for making the clutch go into an engaging state, and thereby. The series hybrid mode is realized by an operation for making the brake go into an engaging state and an operation for making the clutch go into a release state, and thereby. Accordingly, when the drive mode is changed from the series-parallel hybrid mode to the series hybrid mode, an operation of the brake for changing the state of the brake from the release state to the engaging state and an operation of the clutch for changing the state of the clutch from the engaging state to the release state are necessary. Furthermore, when the drive mode is changed in the reverse direction, an operation of the brake for changing the state of the brake from the engaging state to the release state and an operation of the clutch for changing the state of the clutch from the release state to the engaging state are necessary.

When the brake or the clutch is operated from the release state to the engaging state, an operating noise sometimes occurs in a process that a difference of rotating speed between elements which engage with each other becomes 0. In the case of the drive apparatus of the Patent Literature 1, it is possible to control the rotating speed of the ring gear as an engaging target of the brake or the clutch by controlling the engine which is connected to the carrier of the planetary gear mechanism. However, since the rotating speed of the engine fluctuates, it is difficult to control the rotating speed of the ring gear precisely by controlling the engine. Accordingly, there is a limit on a decrease of the operating noise of the brake or the clutch by controlling the engine.

In view of the foregoing, one object of the present invention is to provide a drive apparatus for a vehicle capable of suppressing an operating noise which occurs when a clutch and the like are operated.

Solution to Problem

A drive apparatus for a vehicle of the present invention, the drive apparatus including: an engine; a first motor generator; an output shaft for outputting drive power from drive wheels of the vehicle; a second motor generator which transmits power to the output shaft; a power split mechanism having a first rotational element, a second rotational element, and a third rotational element which are capable of differentially rotating with each other, the first rotational element being connected to the engine, and the second rotational element being connected to the first motor generator; a clutch operating between an engaging state where the third rotational element of the power split mechanism and the output shaft are connected with each other and a release state where the third rotational element and the output shaft are separated from each other; a lock mechanism operating between a lock state where the third rotational element of the power split mechanism is locked so as not to rotate and an unlocked state where the third rotational element locked is released; and a rotating speed control device which is configured to control a rotating speed of the third rotational element before a control to the clutch or the lock mechanism is performed, wherein the rotating speed control device controls the rotating speed of the third rotational element by controlling the first motor generator after a rotating speed of the engine is deemed to be zero by executing an engine stop control for stopping the engine, when a condition which the control to the clutch or the lock mechanism is performed is satisfied while the engine is running.

According to this drive apparatus, when the clutch is in the engaging state and the lock mechanism is in the unlocked state, power of the engine is split into two powers by the power split mechanism. A first power which is split by the power split mechanism is converted to electric power by the first motor generator which is connected with the second rotational element, and the converted electric power is supplied to the second motor generator. A second power which is split by the power split mechanism is transmitted to the output shaft via the third rotational element. That is, when the clutch is in the engaging state and the lock mechanism is in the unlocked state, a series-parallel hybrid mode is executed.

Furthermore, when the clutch is in the release state and the lock mechanism is in the lock state, the third rotational element is fixed so as not to rotate. Thereby, the whole of the power of the engine is converted to the electric power by the first motor generator, and the electric power is supplied to the second motor generator. Power of the second motor generator is transmitted to the output shaft which is separated from the third rotational element. That is, when the clutch is in the release state and the lock mechanism is in the lock state, a series hybrid mode is executed. Accordingly, in this drive apparatus, by controlling each of the clutch and the lock mechanism appropriately, it is possible to switch a drive mode between the series-parallel hybrid mode and the series hybrid mode.

Furthermore, in the drive apparatus, when the condition which the control to the clutch or the lock mechanism is performed for switching the drive mode is satisfied while the engine is running, the engine stop control for stopping the engine is executed, and the rotating speed of the third rotational element is controlled by an operation of the first motor generator after executing the engine stop control. In general, the motor generator is easy to control a rotating speed without a rotation fluctuation such as the engine. Accordingly, before the operation of the clutch or the lock mechanism, it is possible to control the rotating speed of the third rotational element precisely by the first motor generator. As a result, it is possible to control a rotating speed difference between the elements which are connected with each other by the clutch or the lock mechanism. Thereby, it is possible to suppress an operating noise which occurs in an operation process that the clutch is switched from the release state to the engaging state or an operation process that the lock mechanism is switched from the unlocked state to the lock state.

In one aspect of the drive apparatus of the present invention, the drive apparatus may further include a shift position selection device where plural shift positions including a parking position, a reverse position, a neutral position, and a drive position are set, the shift position selection device receiving a shift operation for selecting each shift position of the plural shift positions by a driver; and a shift control device which is configured to: control the lock mechanism to go into the lock state and control the clutch to go into the engaging state when the shift position selection device receives the shift operation for selecting the parking position; control the lock mechanism to go into the lock state and control the clutch to go into the release state when the shift position selection device receives the shift operation for selecting the reverse position; and control the lock mechanism to go into the unlocked state and control the clutch to go into the engaging state when the shift position selection device receives the shift operation for selecting the drive position.

In the above aspect, in a case that the reverse position is selected as the shift operation when the drive position or the parking position is in a state of selection while the engine is running, the rotating speed control device may determine that the condition is satisfied and executes a zero rotation control for reducing a rotating speed of the third rotational element so as to get close to zero by controlling the first motor generator after the rotating speed of the engine is deemed to be zero by executing the engine stop control, and the shift control device may control the lock mechanism to go into the lock state from the unlocked state, after the zero rotation control is ended. According to this aspect, before the lock mechanism is controlled to change over from the unlocked state to the lock state in response to the shift operation by the driver, the zero rotation control is executed precisely by the operation of the first motor generator. Since the lock mechanism is controlled from the unlocked state to the lock state after the zero rotation control is executed, it is possible to suppress the operating noise which occurs in this operation process.

In the above aspect, in a case that the drive position or the parking position is selected as the shift operation when the reverse position is in a state of selection while the engine is running, the rotating speed control device may determine that the condition is satisfied and executes a synchronization control for limiting a difference of rotating speed between elements which are connected with each other by the clutch within an allowable range by controlling the first motor generator after the rotating speed of the engine is deemed to be zero by executing the engine stop control, and the shift control device may control the clutch to go into the engaging state from the release state, after the synchronization control is ended. According to this aspect, before the clutch is controlled to change over from the release state to the engaging state in response to the shift operation by the driver, the synchronization control is executed precisely by the operation of the first motor generator. Since the clutch is controlled from the release state to the engaging state after the synchronization control is executed, it is possible to suppress the operating noise which occurs in this operation process.

In the above aspect, the clutch may be configured as a dog clutch, and in a case that the reverse position is selected as the shift operation when the parking position is in a state of selection while the engine is running, the shift control device may control the lock mechanism to go into the unlocked state from the lock state before the engine stop control by the rotating speed control device.

When the parking position is selected, the clutch is controlled to become in the engaging state and the lock mechanism is controlled to become in the lock state. On the other hand, the reverse position is selected, the clutch is controlled to become in the release state and the lock mechanism is controlled to become in the lock state. Thereby, in a case that the shift operation is performed for selecting the reverse position when the parking position is in a state of selection, it is possible to control the clutch to change over from the engaging state to the release state while the lock mechanism is kept in the lock state without controlling the lock mechanism. However, for example, when torque is input to the drive apparatus from the drive wheel side such as a case that the vehicle is parked on the slope inclined backward, the input torque is received by the lock mechanism and the clutch. When the clutch is the dog clutch, engaging force increases as the torque which acts on the clutch increases. Accordingly, the operational power of the clutch for switching the state of the clutch from the engaging state to the release state increases, as the torque which acts on the clutch increases. As described above, when the lock mechanism is controlled to change over from the lock state to the unlocked state in the case that the shift operation is performed for selecting the reverse position when the parking position is in a state of selection, the torque which acts on the clutch is released. Accordingly, the operational power required for the operation of the lock mechanism decreases as compared with a case that the clutch is controlled to change over from the engaging state to the release state while the lock mechanism is kept in the lock state. Furthermore, this release operation is performed when the reverse position is selected, and the engine is running. Thereby, even if the lock mechanism is operated to the unlocked state by selecting the reverse position in the state where the parking position has been selected in a situation that the vehicle is parked on the slope inclined backward, there is no possibility that the driver has a feeling of strangeness by releasing the torque which acts on the clutch.

In the above aspect, in a case that the neutral position is selected as the shift operation, the rotating speed control device may defer an execution of the engine stop control even though the engine is running, and the shift control device may keep a state of each of the lock mechanism and the clutch in a state corresponding to the shift position set before the neutral position selected. According to this aspect, a control pattern is simplified as compared with a case that each of the states of the clutch and the lock mechanism which corresponds to the neutral position is set independently.

In the above aspect, the clutch may be configured as a dog clutch, and the shift control device may execute a torque reduction control for reducing torque which acts on the clutch by controlling the first motor generator before controlling the clutch to go into the release state from the engaging state. According to this aspect, before the clutch is controlled to change over from the engaging state to the release state, the torque which acts on the clutch decreases by the torque reduction control. Thereby, it is possible to reduce the operational power of the clutch for switching the state of the clutch from the engaging state to the release state as compared with a case that the torque reduction control is not executed.

Unless otherwise noted, the "connect" of the present invention means a state that power is allowed to transmit from a first element to a second element. Accordingly, a state that the first element and the second element are connected with each other includes not only a state that the first element and the second element are directly and mechanically connected with each other without any other element between them, but also a state that the first element and the second element are connected with each other with one or more elements between them.

BRIEF DESCRIPTION OF DRAWINGS

FIG. 2 is a diagram showing an operation engagement table of the drive apparatus of FIG. 1.

DESCRIPTION OF EMBODIMENTS

Figure 1:
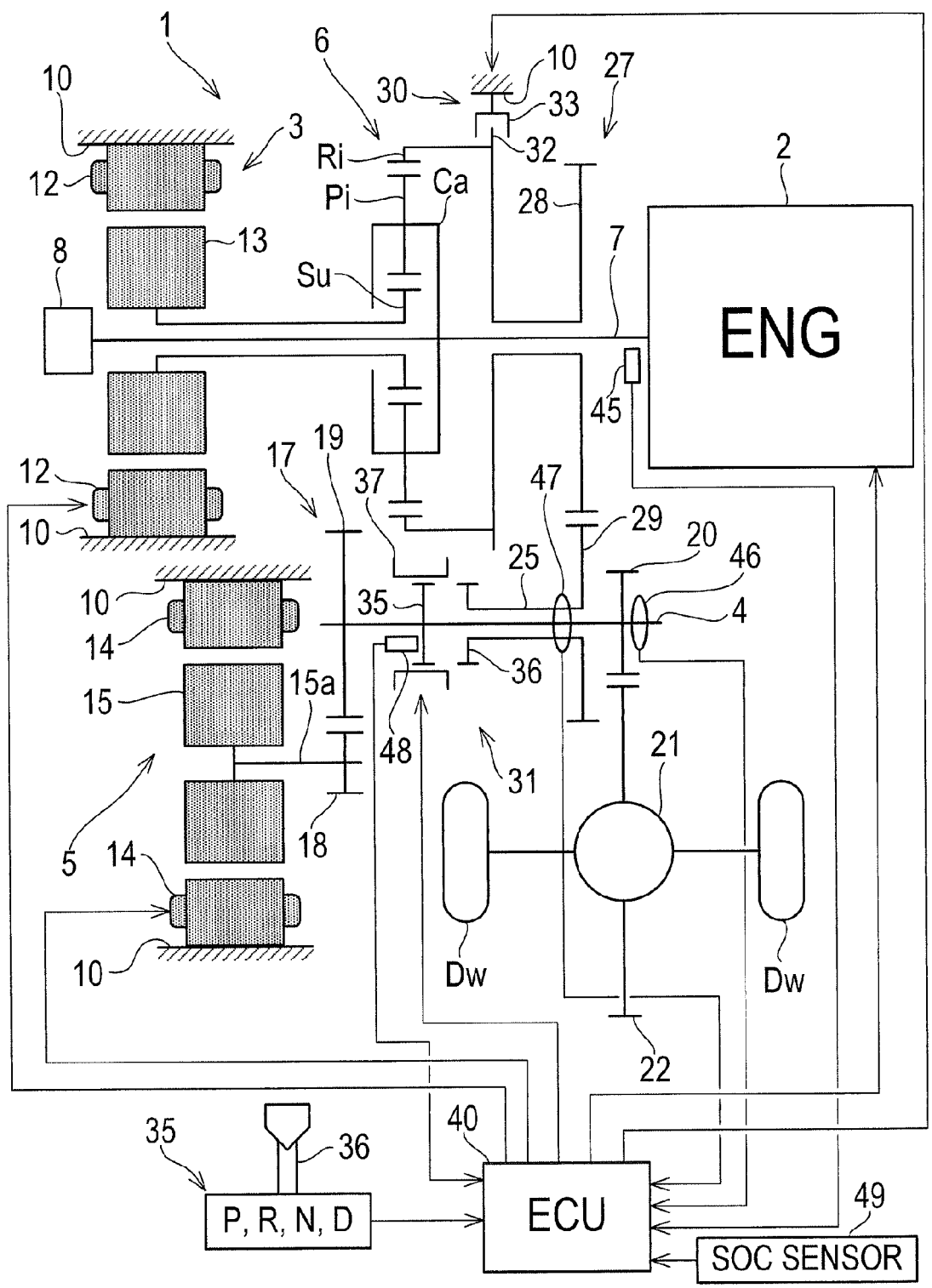
FIG. 1 is a schematic diagram showing an entire configuration of a drive apparatus according to one embodiment of the present invention.

A drive apparatus 1 shown in FIG. 1 is mounted on a vehicle and is used. The vehicle, where the drive apparatus 1 is mounted, functions as a hybrid vehicle. The drive apparatus 1 includes an internal combustion engine (hereinafter, referred to as an engine) 2, a first motor generator 3, an output shaft 4 for outputting drive power from drive wheels Dw of the vehicle, a second motor generator 5 which is capable of transmitting power to the output shaft 4, and a power split mechanism 6 which splits power of the engine 2.

The internal combustion engine 2 is configured as a spark ignition type internal combustion engine having plural cylinders. Power of the internal combustion engine 2 is transmitted to the power split mechanism 6 via an input shaft 7. A damper (not shown) intervenes between the input shaft 7 and the internal combustion engine 2. Torque fluctuations of the internal combustion engine 2 are absorbed by the damper. An end portion of the input shaft 7 is connected to an oil pump 8. The oil pump 8 is driven by the internal combustion engine 2 or the first motor generator 3 via the power split mechanism 6. By driving the oil pump 8, oil is pumped to each part of the drive apparatus 1.

Each of the first motor generator 3 and the second motor generator 5 has a similar structure to each other, and has both functions as an electric motor and as a generator. The first motor generator 3 includes a stator 12 which is fixed to a case 10 and a rotor 13 which is arranged on an inner circumference side of the stator 13 coaxially. The second motor generator 5 also includes a stator 14 which is fixed to the case 10 and a rotor 15 which is arranged on an inner circumference side of the stator 14 coaxially. The first motor generator 3 and the second motor generator 5 are connected electrically to each other via electric devices such as a battery, an inverter, and so on (not shown).

A gear train 17 intervenes between the output shaft 4 and the second motor generator 5. Power of the second motor generator 5 is transmitted to the output shaft 4 via the gear train 17. The gear train 17 includes a drive gear 18 which is fixed to a rotor shaft 15a which rotates integrally with the rotor 15 of the second motor generator 5 and a driven gear 19 which is meshed with the drive gear 18 and is fixed to the output shaft 4. Power which is transmitted to the output shaft 4 is output from an output gear 20 which is fixed to an end portion of the output shaft 4. The output gear 20 is meshed with a ring gear 22 of a differential mechanism 21 which is mounted on the vehicle. Power which is transmitted via the ring gear 22 is distributed to right and left drive wheels Dw by the differential mechanism 21.

The power split mechanism 6 is configured as a single pinion type planetary gear mechanism having three rotational elements which are capable of differentially rotating with respect to each other. The power split mechanism 6 includes a sun gear Su which is an external gear, a ring gear Ri which is an internal gear disposed coaxially with the sun gear Su, and a carrier Ca which supports pinion gears Pi meshing with these gears S, R so that the pinion gears Pi are capable of rotating and are capable of revolving. In the present embodiment, the internal combustion engine 2 is connected to the carrier Ca via the input shaft 7, and the first motor generator 3 is connected to the sun gear Su. Accordingly, the carrier Ca corresponds to a first rotational element according to the present invention, the sun gear Su corresponds to a second rotational element according to the present invention, and the ring gear Ri which is a remaining rotational element corresponds to a third rotational element according to the present invention.

A hollow shaft 25 is arranged on an outer circumference of the output shaft 4 coaxially so as to be allowed to rotate relatively with respect to the output shaft 4. A gear train 27 intervenes between the power split mechanism 6 and the hollow shaft 25. Power which is output from the power split mechanism 6 is transmitted to the hollow shaft 25 via the gear train 27. The gear train 27 includes a drive gear 28 which rotates integrally with the ring gear Ri of the power split mechanism 6 and a driven gear 29 which is meshed with drive gear 28 and is fixed to the hollow shaft 25.

The drive apparatus 1 further includes a parking mechanism 30 and a clutch 31 for switching a drive mode between a series-parallel hybrid mode and a series hybrid mode. The parking mechanism 30 has a same structure as a well known mechanism has. That is, the parking mechanism 30 includes a parking gear 32 which rotates integrally with the ring gear Ri, and a parking pole 33 which is engaged with the parking gear 32. Although they are not shown in detail, the parking pole 33 is connected to the case 10 so as to be allowed to operate between an engaging position where the parking pole 33 engages with the parking gear 32 and a retracting position where the parking pole 33 separates from the parking gear 32. When the parking gear 32 and the parking pole 33 are engaged with each other, the parking gear 32 and the ring gear Ri are locked so as not to rotate. On the other hand, when the engagement between the parking gear 32 and the parking pole 33 is released and the parking pole 33 is separated from the parking gear 32, the parking gear 32 and the ring gear Ri become free to rotate. That is, the parking mechanism 30 operates between a lock state where the ring gear Ri is locked so as not to rotate and an unlocked state where the ring gear Ri locked is released. Accordingly, the parking mechanism 30 corresponds to a lock mechanism according to the present invention.

The clutch 31 is configured as a well known dog clutch. The clutch 31 has a first hub 35 which rotates integrally with the output shaft 4, a second hub 36 which rotates integrally with the hollow shaft 25, and a sleeve 37 which is spline-engaged on an outer circumference of the first hub 35. An outer diameter of the first hub 35 and an outer diameter of the second hub 36 are same as each other. On a circumferential portion of each of hubs 35, 36, spline teeth are formed so as to be capable of engaging with spline grooves formed on an inner circumference of the sleeve 37. The sleeve 37 is allowed to move in a direction of the rotational axis (a horizontal direction of FIG. 1) while being inhibited to rotate relatively with respect to the first hub 35. Accordingly, when the sleeve 37 moves in a right direction from a position shown in FIG. 1 and is engaged with both of the first hub 35 and the second hub 36, a difference of rotating speed between the first hub 35 and the second hub 36 becomes 0. That is, the output shaft 4 which is fixed to the first hub 35 and the hollow shaft 25 which is fixed to the second hub 36 are connected with each other. Thereby, the ring gear Ri goes into a state where the ring gear Ri is connected with the output shaft 4 via the gear train 27 and the hollow shaft 25. This state corresponds to an engaging state of the clutch 31. On the other hand, when the sleeve 37 is returned to the position shown in FIG. 1 from the state where the sleeve 37 is engaged with both of the first hub 35 and the second hub 36, the ring gear Ri goes into a state where the ring gear Ri and the output shaft 4 are separated from each other. This state corresponds to a release state of the clutch 31. Accordingly, the clutch 31 operates between the engaging state where the ring gear Ri and the output shaft 4 are connected with each other and the release state where the ring gear Ri and the output shaft 4 are separated from each other.

The drive apparatus 1 is provided with a selector 35 as a shift position selection device where plural shift positions are set. The selector 35 is provided in a vehicle interior of the vehicle where the drive apparatus 1 is mounted. The selector 35 includes a selector lever 36 which is operated by a driver, and is allowed to receive a shift operation performed by the driver via the selector lever 36. The selector 35 outputs a shift position signal according to a currently selected shift position, that is, a current position of the selector lever 36. In the drive apparatus 1, a parking position P, a reverse position R, a neutral position N, and a drive position D are set as the plural shift positions.

As shown in FIG. 2, in the drive apparatus 1, an operating state of each of the parking mechanism 30 and the clutch 31 is correlated with each of the shift positions. And, basically, the series-parallel hybrid mode is correlated with a case of the drive position D, and the series hybrid mode is correlated with a case of the reverse position R. However, in the drive position D, the drive mode may be switched from the series-parallel hybrid mode to the series hybrid mode depending on the running state of the vehicle and a charging state of the battery. An "ON" in the figure means the lock state of the parking mechanism 30 or the engaging state of the clutch 31. Furthermore, an "OFF" in the figure means the unlocked state of the parking mechanism 30 or the release state of the clutch 31.

Figure 3:
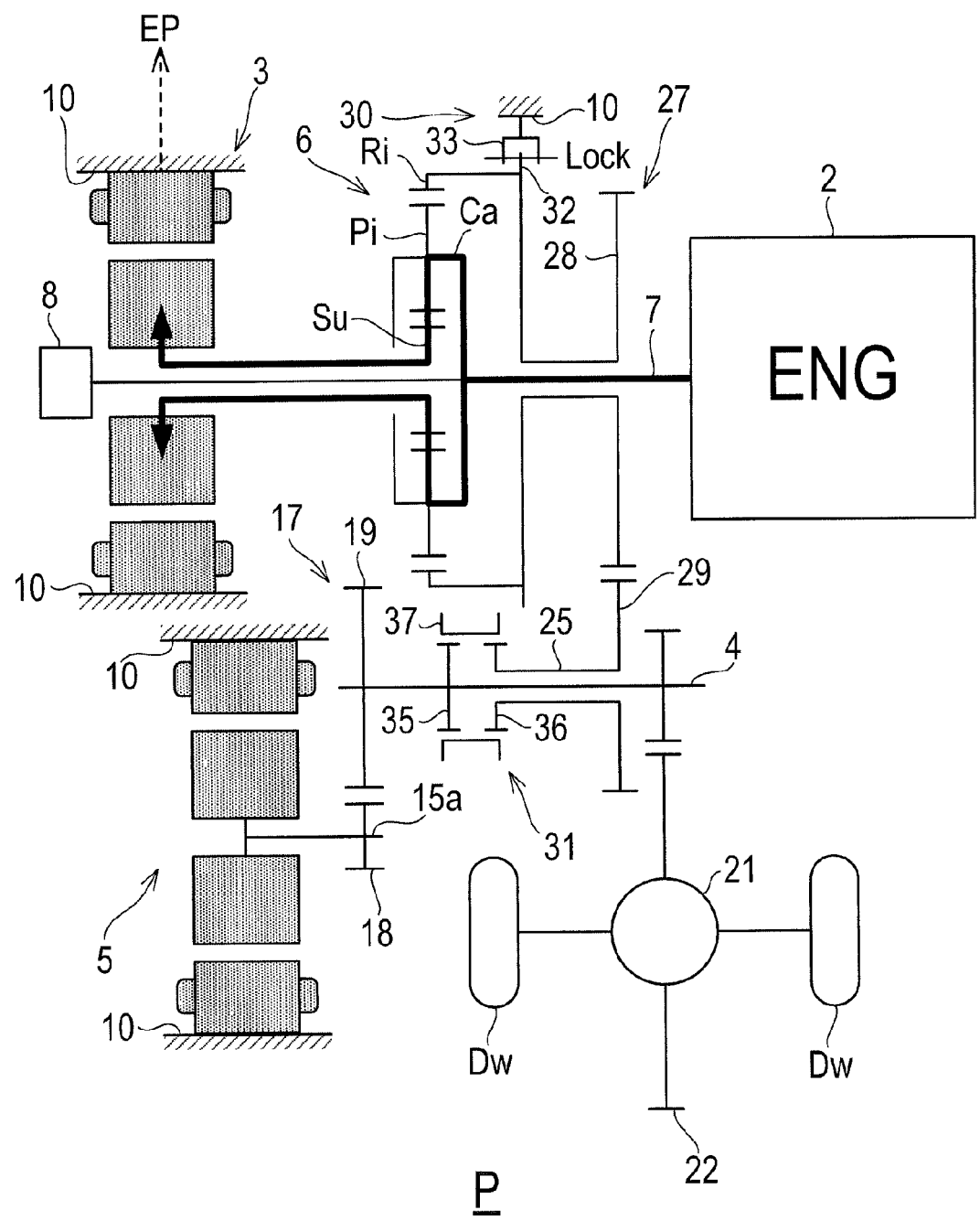
FIG. 3 is explanatory diagram showing a state of each of a parking mechanism and a clutch, and a state of power transmission when a parking position is selected.

As shown in FIG. 3, when the parking position P is selected, the parking mechanism 30 is controlled to go into the lock state and the clutch 31 is controlled to go into the engaging state. Accordingly, torque which is input from a side of the drive wheels Dw is received by the parking mechanism 30 and the clutch 31. And, since the power of the engine 2 is transmitted to the first motor generator 3 by a power transmission path which is shown by a directional line in the FIG. 3, it is possible to generate electric power by the first motor generator 3.

Figure 4:
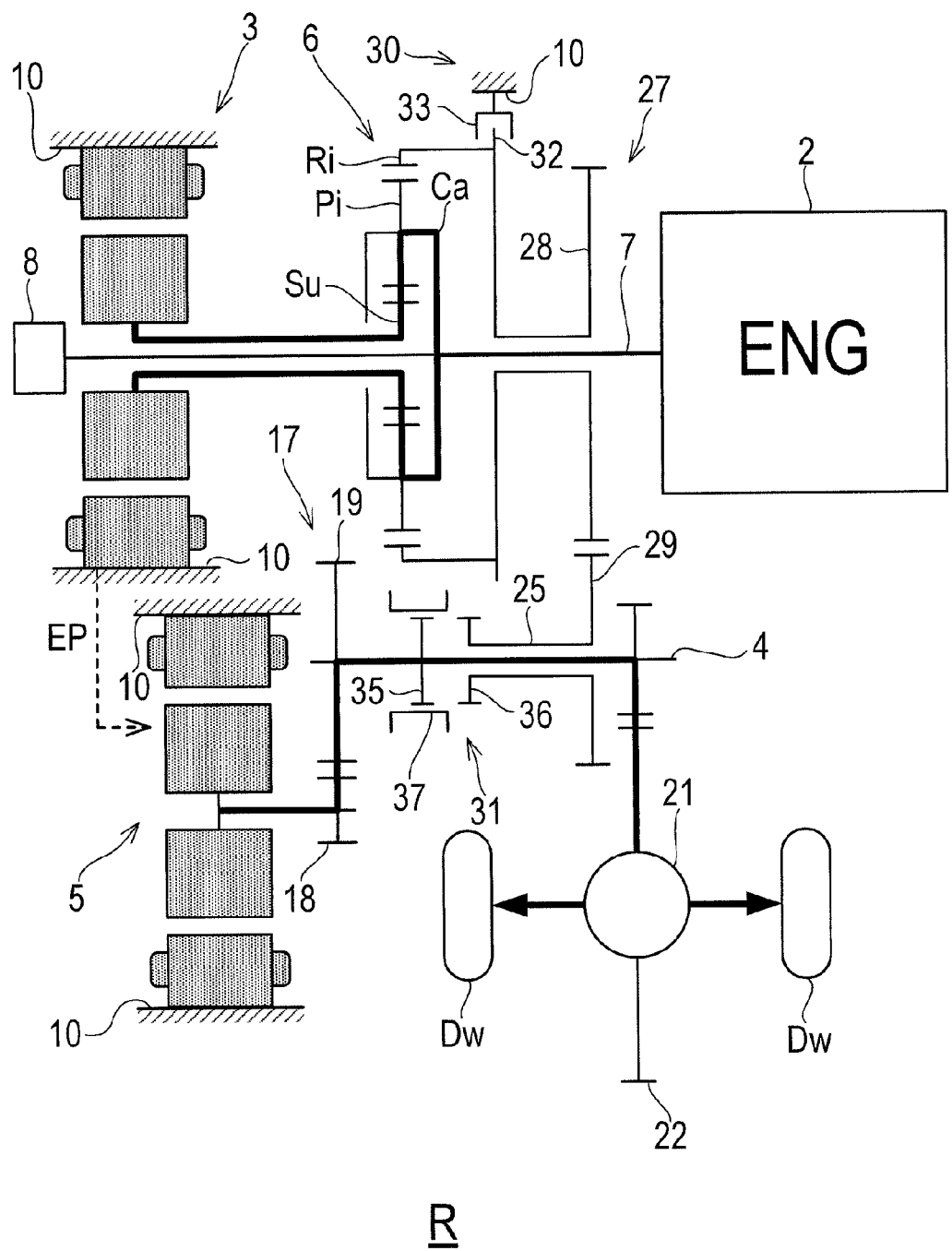
FIG. 4 is explanatory diagram showing a state of each of the parking mechanism and the clutch, and a state of the power transmission when a reverse position is selected.

As shown in FIG. 4, when the reverse position R is selected, the parking mechanism 30 is controlled to go into the lock state and the clutch 31 is controlled to go into the release state. Thereby, the ring gear Ri of the power split mechanism 6 is fixed so as not to rotate, and the output shaft 4 and the hollow shaft 25 are separated from each other. Accordingly, the drive mode of the drive apparatus 1 is switched to the series hybrid mode which has a power transmission path shown by a directional line in the FIG. 4. That is, the whole of the power of the engine 2 is converted to the electric power EP by the first motor generator, and the second motor generator 5 is driven by using the electric power. The power of the second motor generator 5 is output from the right and left drive wheels Dw via the output shaft 4 and the differential mechanism 21.

Figure 5:
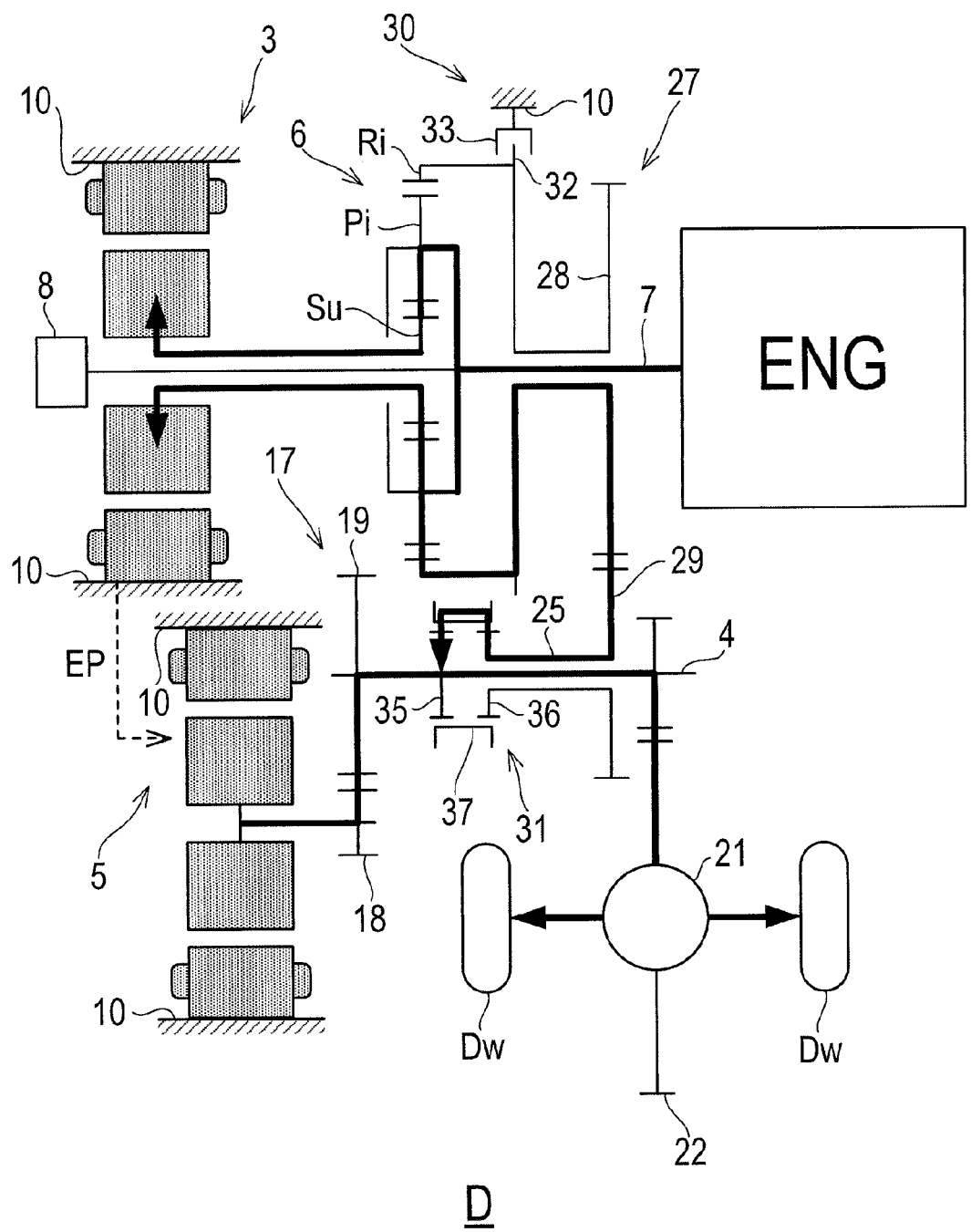
FIG. 5 is an explanatory diagram showing a state of each of the parking mechanism and the clutch, and a state of the power transmission when a drive position is selected.

As shown in FIG. 5, when the drive position D is selected, the parking mechanism 30 is controlled to go into the unlocked state and the clutch 31 is controlled to go into the engaging state. Thereby, the ring gear Ri of the power split mechanism 6 is released from a restriction of rotation, and the output shaft 4 and the hollow shaft 25 are connected with each other. Accordingly, the drive mode of the drive apparatus 1 is switched to the series-parallel hybrid mode which has a power transmission path shown by a directional line in FIG. 5. That is, the power of the engine 2 is split into two powers, and a first power is transmitted to the first motor generator 3 and a second power is transmitted to the output shaft 4. The power which is transmitted to the first motor generator 3 is converted to the electric power EP, and the electric power EP is supplied to the second motor generator 5. The power of the second motor generator 5 is transmitted to the output shaft 4. These powers which are transmitted to the output shaft 4 are output from the right and left drive wheels Dw via the differential mechanism 21.

As shown in FIG. 2, when the neutral position N is selected, the parking mechanism 30 and the clutch 31 are kept in the states corresponding to the shift position set before the neutral position N is selected. For example, in a case that the neutral position N is selected when the drive position D is in a case of selection, each of the parking mechanism 30 and the clutch 31 is kept in a state corresponding to the drive position D. That is, in this case, the parking mechanism 30 is kept in the unlocked state and the clutch 31 is kept in the engaging state.

As shown in FIG. 1, the drive apparatus 1 is provided with an electronic control unit (ECU) 40 which controls the parking mechanism 30 and the clutch 31 according to a shifting operation that the driver selects the shift position. The ECU 40 is configured as a computer unit. The ECU 40 also performs operation controls of the internal combustion engine 2, the first motor generator 3, and the second motor generator 4 along with the controls of the parking mechanism 30 and the clutch 31. For example, the ECU 40 calculates a required driving power based on an operation amount of an accelerator pedal (not shown) by the driver and controls the operations of the internal combustion engine 2, the first motor generator 3, and the second motor generator 5 in accordance with the drive mode so that the required driving power is output from the drive wheels Dw. The ECU 40 executes various controls, but described below is only control relating to the present invention within the various controls.

To the ECU 40, input are signals from various sensors for obtaining an operating state of the drive apparatus 1. A shift position signal is input to the ECU 40 from the above selector 35. A crank angle sensor that outputs a signal according to a rotating speed of the engine 2, a first resolver 46 that outputs a signal according to a rotating speed of the output shaft 4, a second resolver 47 that outputs a signal according to a rotating speed of the hollow shaft 25, a torque sensor 48 that outputs a signal according to torque acting to the clutch 31, and an SOC sensor 49 that outputs a signal according on a state of charge of the battery (not shown) are connected electrically with the ECU 40 as sensors relating to the present invention.

The present embodiment is characterized by the control which is executed by the ECU 40 in the process that the shift position is changed. Hereinafter, the following cases: (1) a case that the reverse position R is selected as the shift operation when the drive position D is in a state of selection; (2) a case that the drive position D is selected as the shift operation when the reverse position R is in a state of selection; (3) a case that the parking position P is selected as the shift operation when the reverse position R is in a state of selection; and (4) a case that the reverse position R is selected as the shift operation when the parking position P is in a state of selection, are described with reference to figures.

In alignment charts shown in FIGS. 7A-7F, FIGS. 9A-9E, FIGS. 11A-11F and FIGS. 13A-13G, "Eng" means the engine 2, "MG1" means the first motor generator 3, "MG2" means the second motor generator 5, "Out" means the output shaft 4, "P" means the parking mechanism 30, and "C" means the clutch 31.

(1) the Case of "D→R" (FIG. 6 and FIGS. 7A-7F)

Figure 6:
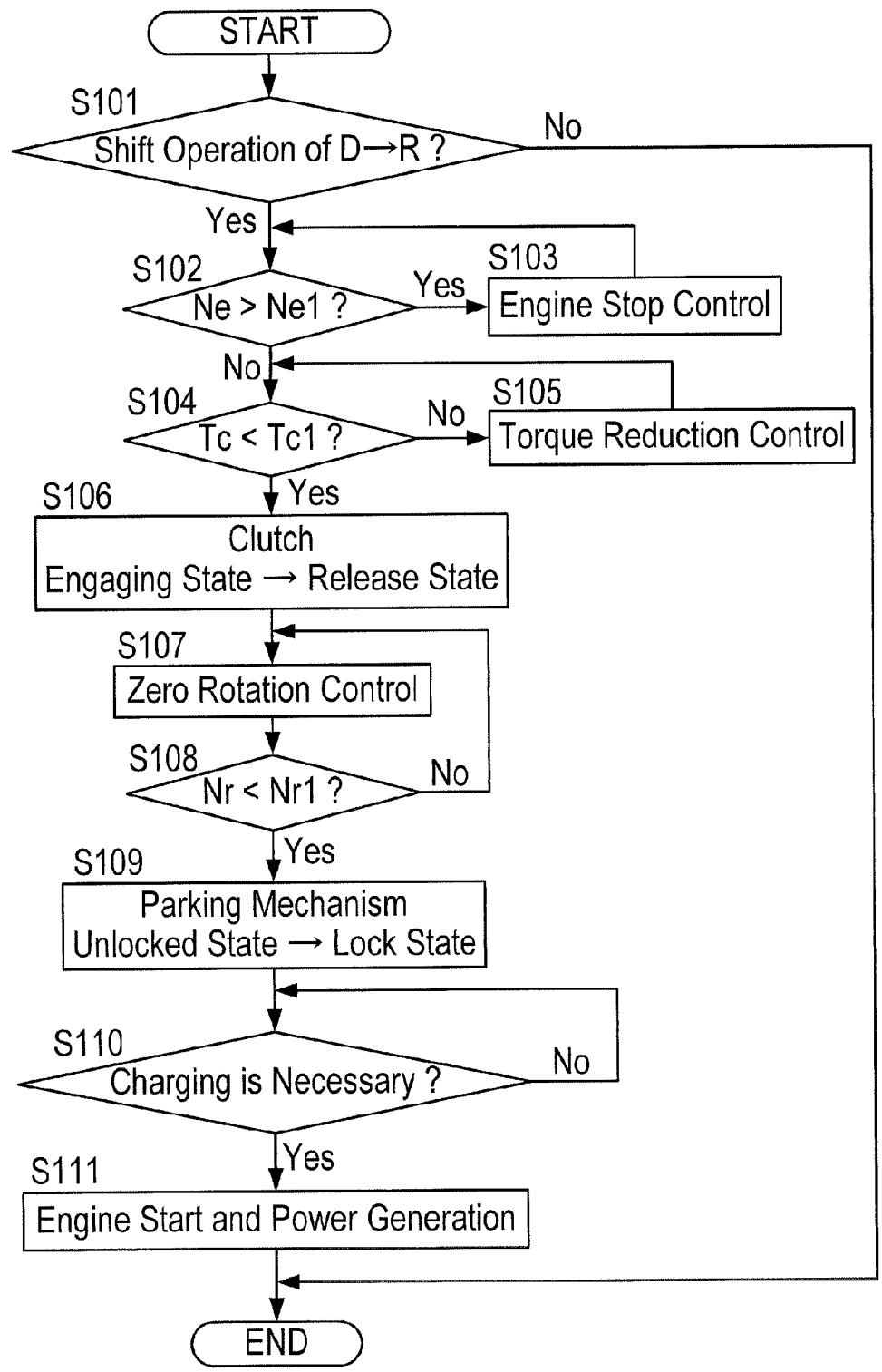
FIG. 6 is a flowchart showing a control routine which is executed in a case that the reverse position is selected as the shift operation when the drive position is in a state of selection.

In this case, the drive mode is switched from the series-parallel hybrid mode to the series hybrid mode (see FIG. 2). A control routine in FIG. 6 is started when the drive position D is in a state of selection.

In the step S101, the ECU 40 determines whether or not the reverse position R is selected as the shift operation when the drive position D is in a state of selection. This determination is performed by the ECU 40 which refers to the shift position signal of the selector 35. When the ECU 40 determines that the reverse position R is selected, the ECU 40 goes to the step S102. On the other hand, the ECU 40 determines that the reverse position R is not selected, the ECU 40 skips subsequent processes and ends the routine of this time.

In the step S102, the ECU 40 determines whether or not the rotating speed Ne of the engine 2 is greater than a predetermined value Ne1. The rotating speed Ne of the engine 2 is obtained by the ECU 40 which refers to the signal of the crank angle sensor 45. The predetermined value Ne1 is set in consideration of a rotation fluctuation of the engine 2. When the rotating speed Ne of the engine 2 is equal to or less than the predetermined value Ne1, the rotating speed Ne of the engine 2 is deemed to be zero. When the rotating speed Ne of the engine 2 is greater than the predetermined value Ne1, the ECU 40 goes to the step S103 and executes an engine stop control. The engine stop control is a control that a fuel injection and a spark ignition of the engine 2 are stopped. The engine stop control is continued until the rotating speed Ne of the engine 2 becomes equal to or less than the predetermined value Ne1. In other words, the engine stop control is continued until it is possible that the rotating speed Ne of the engine 2 is deemed to be zero. By executing the engine stop control, the alignment chart of the drive apparatus 1 transitions from a state shown in FIG. 7A to a state shown in FIG. 7B.

In the step S104, the ECU 40 determines whether or not the torque Tc which acts on the clutch 31 is less than a predetermined value Tc1. The torque Tc is obtained by the ECU 40 which refers to the signal of the torque sensor 48. When the torque Tc is equal to or greater than the predetermined value Tc1, the ECU 40 goes to the step S105 and executes a torque reduction control. The torque reduction control is a control that the torque which acts on the clutch 31 is reduced by controlling the first motor generator 3. The torque reduction control is continued until the torque Tc becomes less than the predetermined value Tc1. The predetermined value Tc1 may be set appropriately according to a performance of the clutch 31 within a range that a reduction effect of the operational power of the clutch 31 is obtained substantially.

In the step S106, the ECU 40 controls the clutch 31 to go into the release state from the engaging state. This operation control is executed after the torque reduction control of the step S105 is executed. Accordingly, the operational power of the clutch 31 is reduced compared with a case that the torque reduction control is not executed. By controlling the clutch 31 from the engaging state to the release state, the alignment chart of the drive apparatus 1 transitions from a state shown in FIG. 7B to a state shown in FIG. 7C and the power transmission is shut off by the clutch 31.

In the step S107, the ECU 40 executes a zero rotation control that a rotating speed Nr of the ring gear Ri of the power split mechanism 6 is reduced so as to be close to zero by controlling the first motor generator 3. The rotating speed Nr of the ring gear Ri is calculated in such a way that the ECU 40 first calculates a rotating speed Nrx of the hollow shaft 25 with reference to the signal of the second resolver 47, and next multiplies the rotating speed Nrx by a gear ratio of the gear train 27.

Figure 7A:
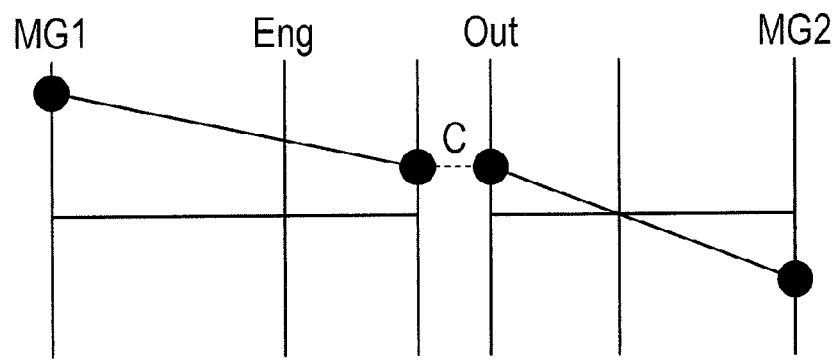
FIG. 7A is an alignment chart of the drive apparatus when the drive position is selected.
Figure 7B:
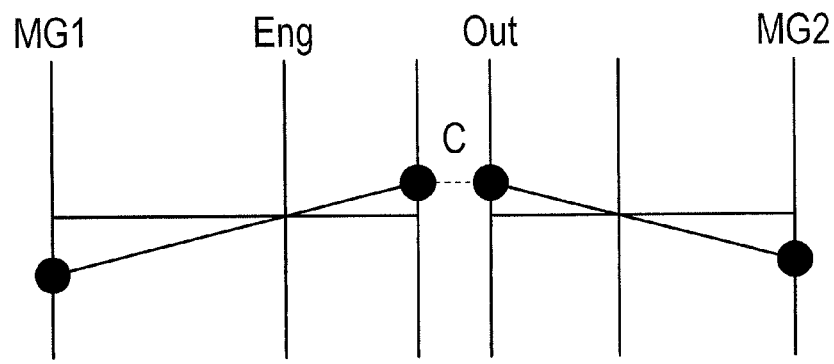
FIG. 7B is an alignment chart in a case that an engine stop control is executed when the drive apparatus is in a state shown in FIG. 7A.
Figure 7C:
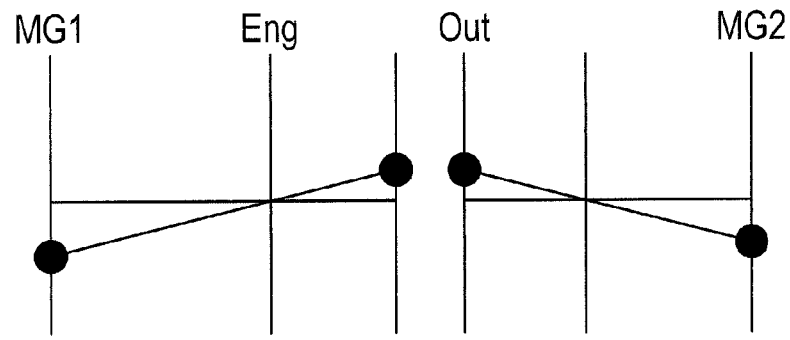
FIG. 7C is an alignment chart in a case that the clutch is controlled to change over to a release state when the drive apparatus is in a state shown in FIG. 7B.
Figure 7D:
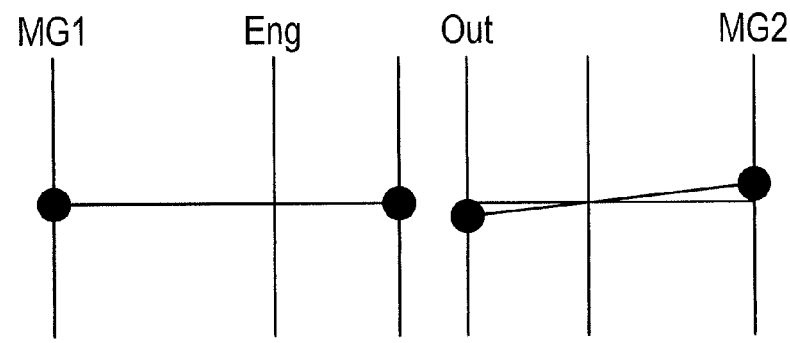
FIG. 7D is an alignment chart in a case that a zero rotation control is executed when the drive apparatus is in a state shown in FIG. 7C.

In the step S108, the ECU 40 determines whether or not the rotating speed Nr of the ring gear Ri is less than a predetermined value Nr1. The predetermined value Nr1 corresponds to an upper limit value of an allowable range that the ring gear Ri is allowed to go into the lock state without any problem by the operation of the parking mechanism 30. When the rotating speed Nr is equal to or greater than the predetermined value Nr1, the ECU 40 returns to the step S107 and continues the zero rotation control until the rotating speed Nr becomes less than the predetermined value Nr1. Thereby, as shown in FIG. 7D, the rotating speed of the ring gear Ri gets close to zero. The zero rotation control becomes more precise as the predetermined value Nr1 decreases. Thereby, by setting the predetermined value Nr1 appropriately, it is possible to suppress an operating noise which occurs in the operation process of the parking mechanism 30. A rotating speed control of the first motor generator 3 is more sensitive compared with a rotating speed control of the engine 2. Thereby, it is possible to make the predetermined value Nr1 smaller compared with a case that the zero rotation control is executed by controlling the engine 2.

Figure 7E:
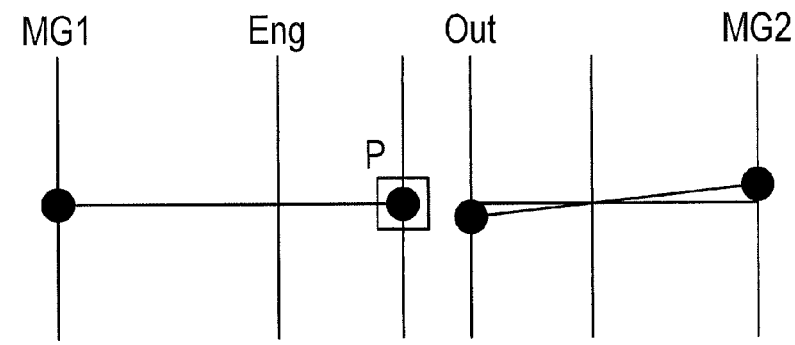
FIG. 7E is an alignment chart in a case that the parking mechanism is controlled to change over to a lock state when the drive apparatus is in a state shown in FIG. 7D.

In the step S109, the ECU 40 controls the parking mechanism 30 so that the state is switched from the unlocked state to the lock state. Thereby, as shown in FIG. 7E, the ring gear Ri goes into a state where the rotation is not allowed. That is, the rotating speed of the ring gear Ri is fixed to zero. As a result, the drive mode transitions from the series-parallel hybrid mode to the series hybrid mode. It is possible to drive the vehicle in reverse by driving the second motor generator 5.

In the step S110, the ECU 40 obtains the state of charge of the battery by referring to the signal of the SOC sensor 49, and determines whether or not a current state of charge is a state where it is necessary to generate electrical power by the first motor generator 3. When it is necessary to charge the battery, the ECU 40 goes to the step S111. When it is not necessary to charge the battery, the ECU 40 defers the processes.

Figure 7F:
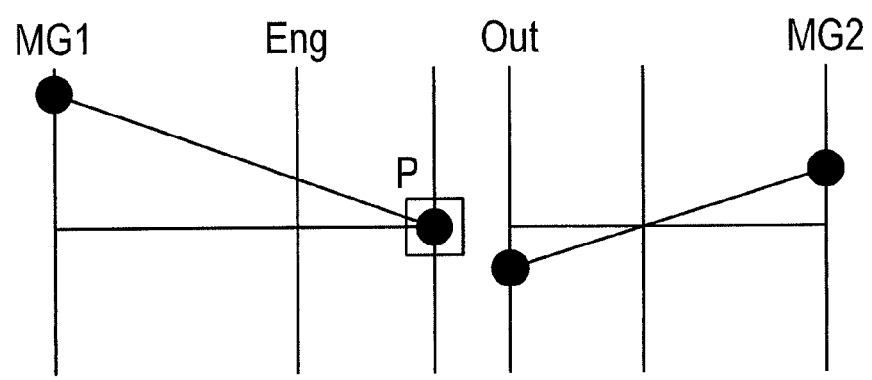
FIG. 7F is an alignment chart in a case that the engine is restarted and a power generation is performed when the drive apparatus is in a state shown in FIG. 7E.

In the step S111, the ECU 40 restarts the engine 2 which was stopped in the step S103. And, as shown in FIG. 7F, the ECU 40 drives the first motor generator 3 by using the power of the engine 2 which is restarted, and makes the first motor generator 3 generate the electrical power. The power of the engine 2 is converted to the electrical power by the electrical generation of the first motor generator 3, and the electrical power is used to charge the battery and is supplied to the second motor generator 5.

(2) the Case of "R→D" (FIG. 8 and FIGS. 9A-9E)

Figure 8:
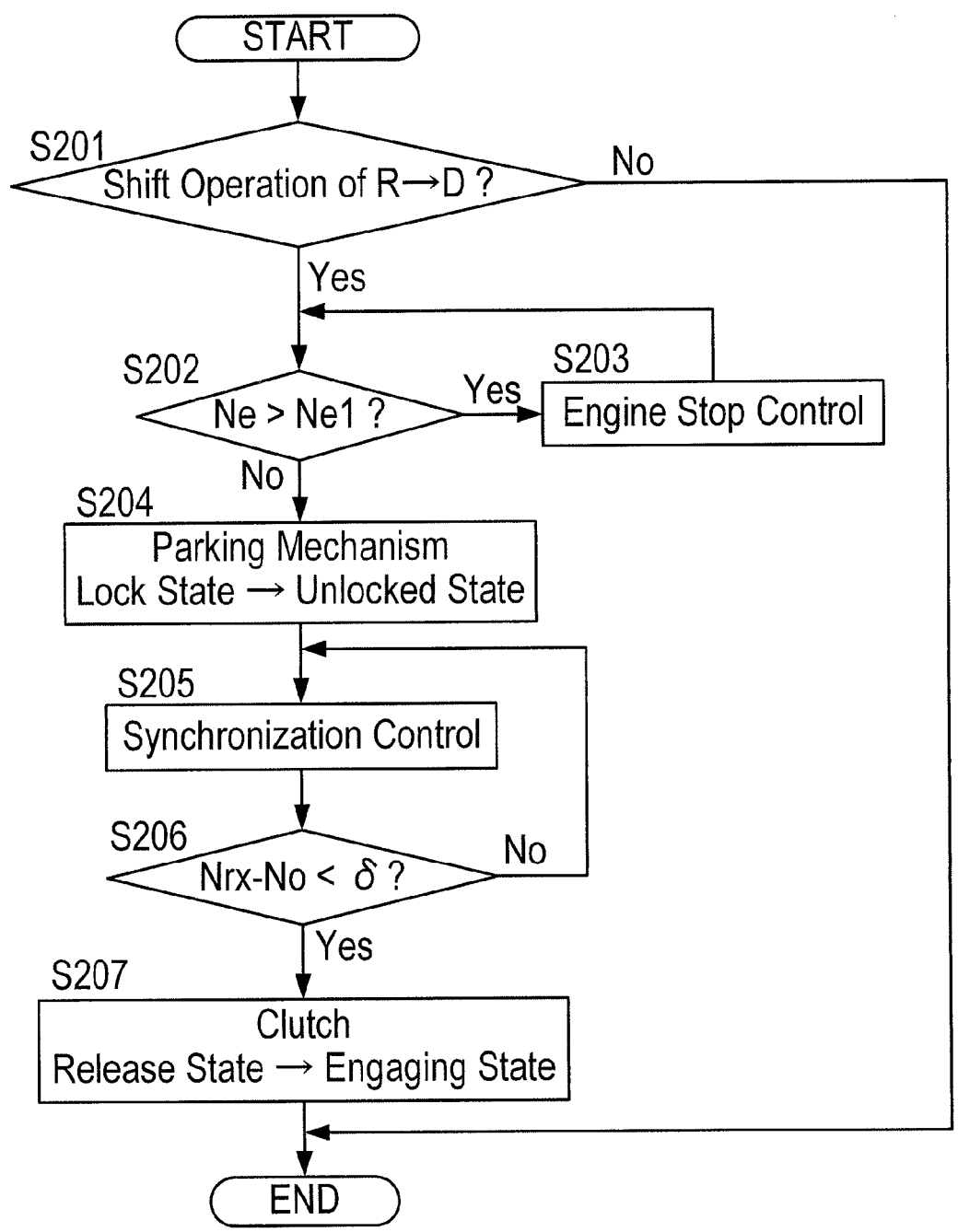
FIG. 8 is a flowchart showing a control routine which is executed in a case that the drive position is selected as the shift operation when the reverse position is in a state of selection.

In this case, the drive mode is switched from the series hybrid mode to the series-parallel hybrid mode. A control routine in FIG. 8 is started when the reverse position R is in a state of selection.

In the step S201, the ECU 40 determines whether or not the drive position D is selected as the shift operation when the reveres position R is in a state of selection. This determination is performed by the ECU 40 which refers to the shift position signal of the selector 35. When the ECU 40 determines that the drive position D is selected, the ECU 40 goes to the step S202. On the other hand, the ECU 40 determines that the drive position D is not selected, the ECU 40 skips subsequent processes and ends the routine of this time.

In the step S202, the ECU 40 determines whether or not the rotating speed Ne of the engine 2 is greater than the predetermined value Ne1. The rotating speed Ne of the engine 2 is obtained by the ECU 40 which refers to the signal of the crank angle sensor 45. The predetermined value Ne1 uses the same value as the predetermined value Ne1 of the routine in the FIG. 6. When the rotating speed Ne of the engine 2 is greater than the predetermined value Ne1, the ECU 40 goes to the step S203 and executes the engine stop control. The engine stop control is continued until it is possible that the rotating speed of the engine 2 is deemed to be zero. By executing the engine stop control, the alignment chart of the drive apparatus 1 transitions from a state shown in FIG. 9A to a state shown in FIG. 9B.

Figure 9A:
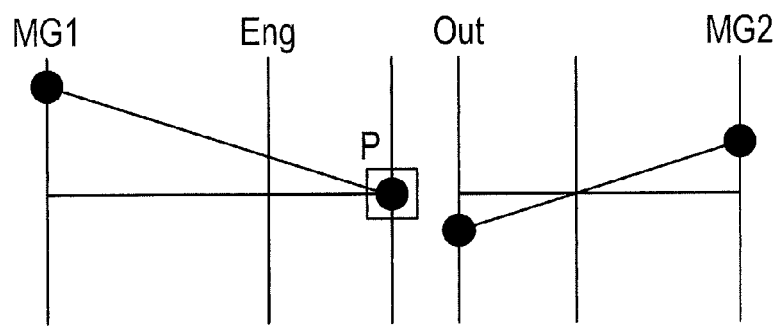
FIG. 9A is an alignment chart of the drive apparatus when the reverse position is selected.
Figure 9B:
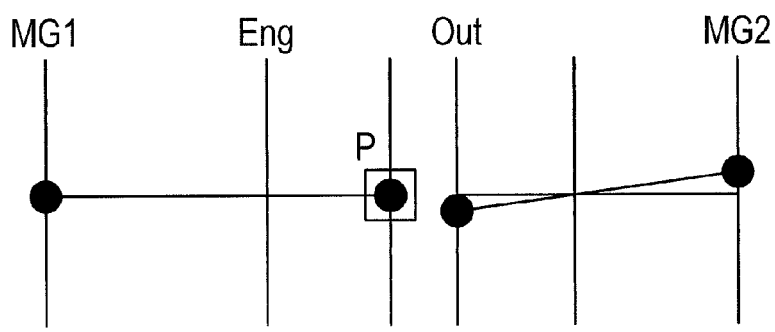
FIG. 9B is an alignment chart in a case that the engine stop control is executed when the drive apparatus is in a state shown in FIG. 9A.
Figure 9C:
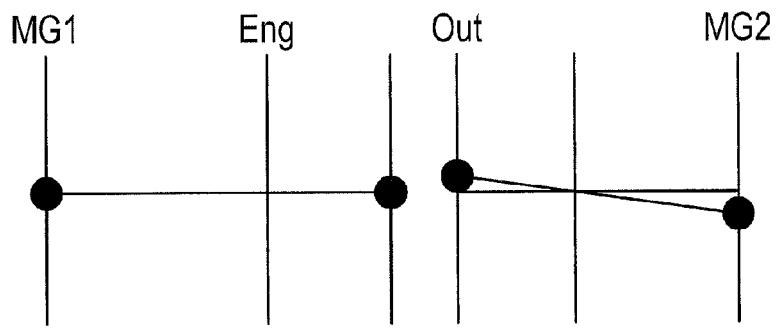
FIG. 9C is an alignment chart in a case that the parking mechanism is controlled to change over to an unlocked state when the drive apparatus is in a state shown in FIG. 9B.
Figure 9D:
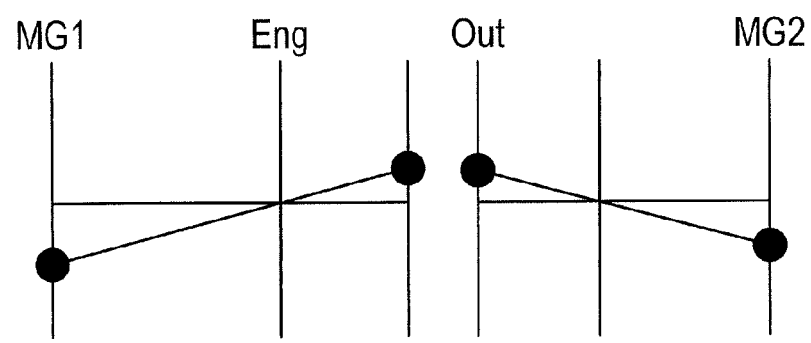
FIG. 9D is an alignment chart in a case that a synchronization control is executed when the drive apparatus is in a state shown in FIG. 9C.

In the step S204, the ECU 40 controls the parking mechanism 30 so that the state of the parking mechanism 30 is switched from the lock state to the unlocked state. Thereby, as shown in FIG. 9C, the ring gear Ri is released from a restriction of rotation and becomes in a rotatable state.

In the step S205, the ECU 40 starts a synchronization control by controlling the first motor generator 3. The synchronization control is a control that the rotating speed Nrx of the hollow shaft 25 and the rotating speed No of the output shaft 4 are synchronized with each other by controlling the first motor generator 3 to control the rotating speed of the ring gear Ri. As is obvious by reference to the next step S206, the synchronization control is continued until a rotating speed difference Nrx−No between the hollow shaft 25 and the output shaft 4 which are connected with each other by the clutch 31 becomes less than a predetermined value δ. The predetermined value δ corresponds to an upper limit value of an allowable range of the rotating speed difference. Accordingly, by repeating the step S205 until the rotating speed difference Nrx−No becomes less than the predetermined value δ, the rotating speed difference Nrx−No becomes within the allowable range. The allowable range is a range that it is allowed to control the clutch 31 without any problem. The synchronization control becomes more precise as the predetermined value δ decreases. Thereby, by setting the predetermined value δ appropriately, it is possible to suppress the operating noise which occurs in the operation process of the clutch 31. A rotating speed control of the first motor generator 3 is more sensitive compared with a rotating speed control of the engine 2. Thereby, it is possible to make the predetermined value δ smaller compared with a case that the synchronization control is executed by controlling the engine 2.

Figure 9E:
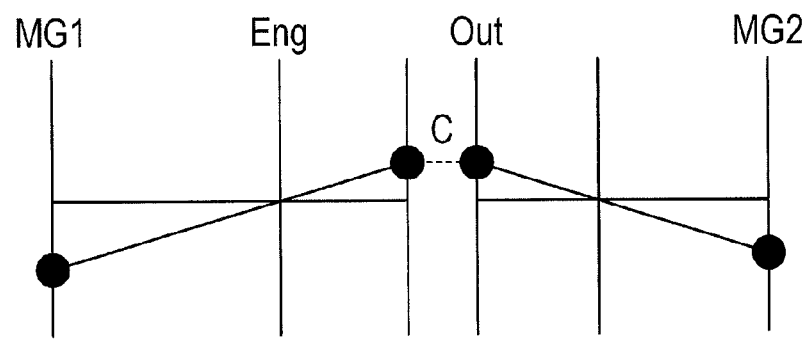
FIG. 9E is an alignment chart in a case that the clutch is controlled to change over to an engaging state when the drive apparatus is in a state shown in FIG. 9D.

In the step S207, the ECU 40 controls the clutch 31 so that the state of the clutch 31 is switched from the release state to the engaging state. Thereby, as shown in FIG. 9E, the hollow shaft 25 and the output shaft 4 become in a state where the hollow shaft 25 and the output shaft 4 rotate integrally with each other. As a result, the drive mode is converted from the series hybrid mode to the series-parallel hybrid mode.

(3) The Case of "R→P" (FIG. 10 and FIGS. 11A-11F)

Figure 10:
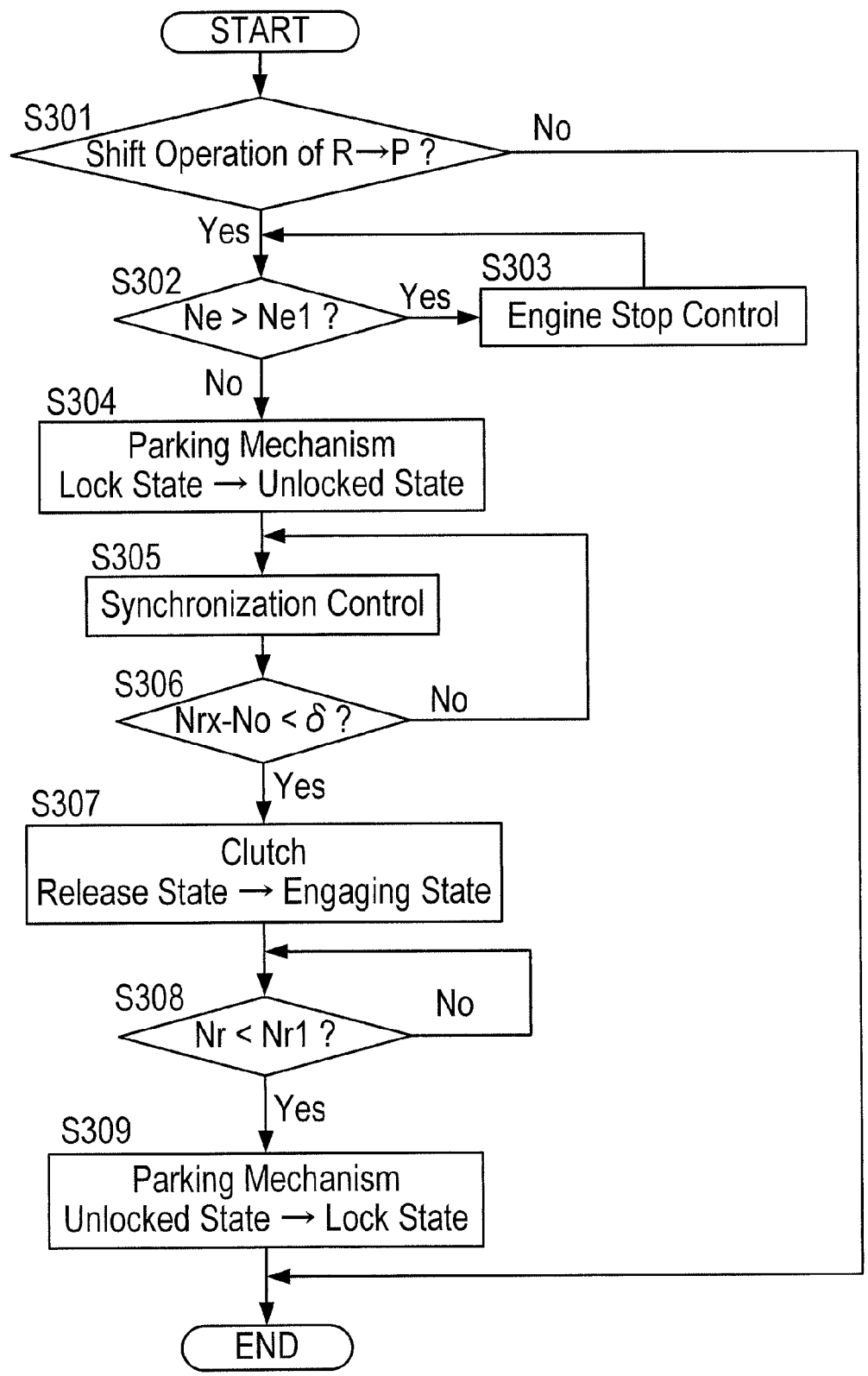
FIG. 10 is a flowchart showing a control routine which is executed in a case that the parking position is selected as the shift operation when the reverse position is in a state of selection.

This case corresponds to a case that the parking position is selected in a process that the vehicle backing in the series hybrid mode is parked. A control routine in FIG. 10 is started when the reverse position R is in a state of selection.

In the step S301, the ECU 40 determines whether or not the parking position P is selected as the shift operation when the reverse position R is in a state of selection. This determination is performed by the ECU 40 which refers to the shift position signal of the selector 35. When the ECU 40 determines that the parking position P is selected, the ECU 40 goes to the step S302. On the other hand, the ECU 40 determines that the parking position P is not selected, the ECU 40 skips subsequent processes and ends the routine of this time.

In the step S302, the ECU 40 determines whether or not the rotating speed Ne of the engine 2 is greater than the predetermined value Ne1. The rotating speed Ne of the engine 2 is obtained by the ECU 40 which refers to the signal of the crank angle sensor 45. The predetermined value Ne1 uses the same value as the predetermined value Ne1 of the routine of the FIG. 6. When the rotating speed Ne of the engine 2 is greater than the predetermined value Ne1, the ECU 40 goes to the step S303 and executes the engine stop control. The engine stop control is continued until it is possible that the rotating speed of the engine 2 is deemed to be zero. By executing the engine stop control, the alignment chart of the drive apparatus 1 transitions from a state shown in FIG. 11A to a state shown in FIG. 11B.

Figure 11A:
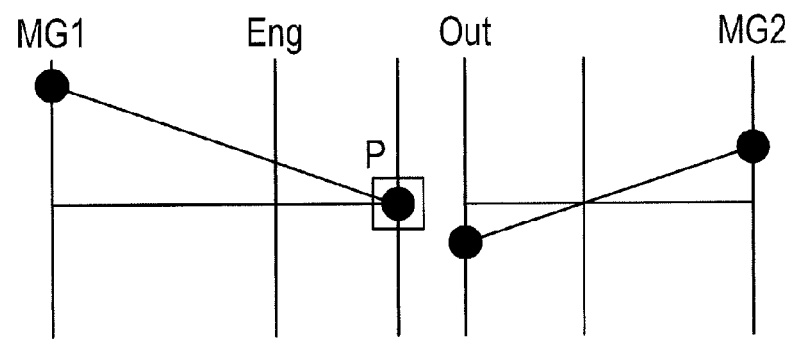
FIG. 11A is an alignment chart of the drive apparatus when the reverse position is selected.
Figure 11B:
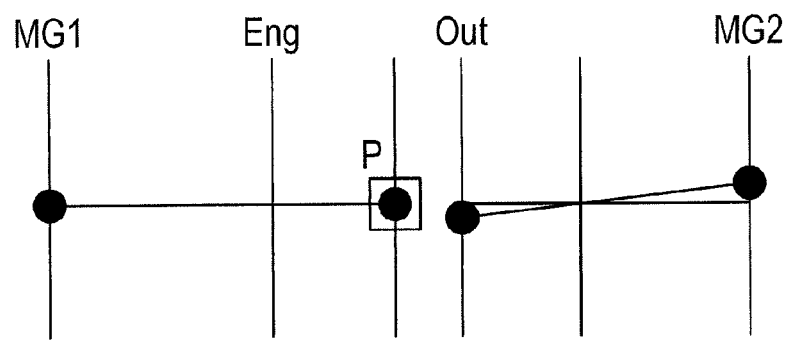
FIG. 11B is an alignment chart in a case that the engine stop control is executed when the drive apparatus is in a state shown in FIG. 11A.
Figure 11C:
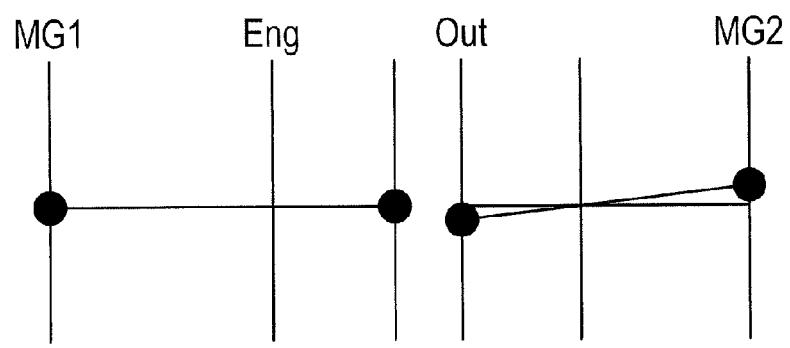
FIG. 11C is an alignment chart in a case that the parking mechanism is controlled to change over to the unlocked state when the drive apparatus is in a state shown in FIG. 11B.

In the step S304, the ECU 40 controls the parking mechanism 30 so that the state of the parking mechanism 30 is switched from the lock state to the unlocked state. Thereby, as shown in FIG. 11C, the ring gear Ri is released from a restriction of rotation and becomes in a rotatable state.

Figure 11D:
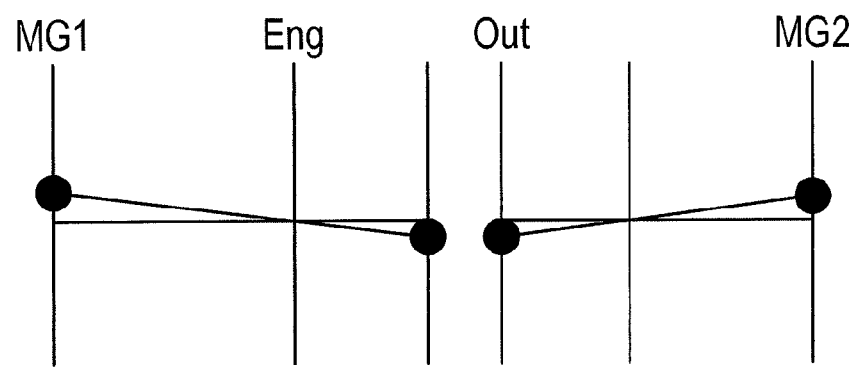
FIG. 11D is an alignment chart in a case that the synchronization control is executed when the drive apparatus is in a state shown in FIG. 11C.

In the step S305, the ECU 40 starts the synchronization control by controlling the first motor generator 3. The synchronization control is the same as the control of FIG. 8. That is, as shown in FIG. 11D, the ECU 40 synchronizes the rotating speed Nrx of the hollow shaft 25 and the rotating speed No of the output shaft 4 by controlling the first motor generator 3 to control the rotating speed of the ring gear Ri. And, the synchronization control is continued until the rotating speed difference Nrx−No between the hollow shaft 25 and the output shaft 4 which are connected with each other by the clutch 31 becomes less than the predetermined value δ (the step S306). The predetermined value δ is the same as the predetermined value δ of the control in FIG. 8. Accordingly, by setting the predetermined value δ appropriately, it is possible to suppress the operating noise which occurs when the clutch 31 operates.

Figure 11E:
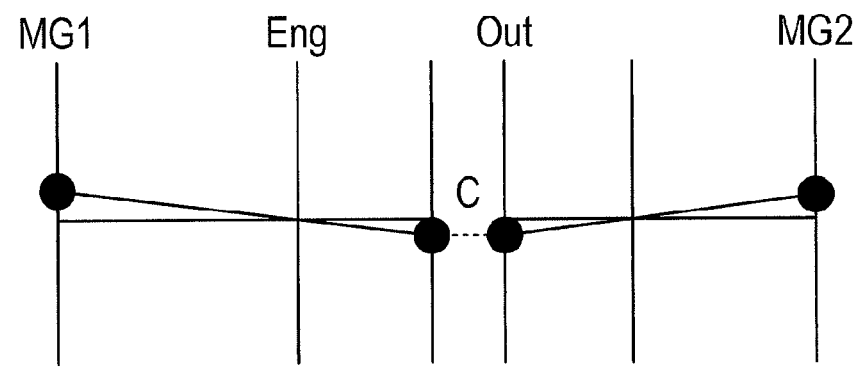
FIG. 11E is an alignment chart in a case that the clutch is controlled to change over to the engaging state when the drive apparatus is in a state shown in FIG. 11D.
Figure 11F:
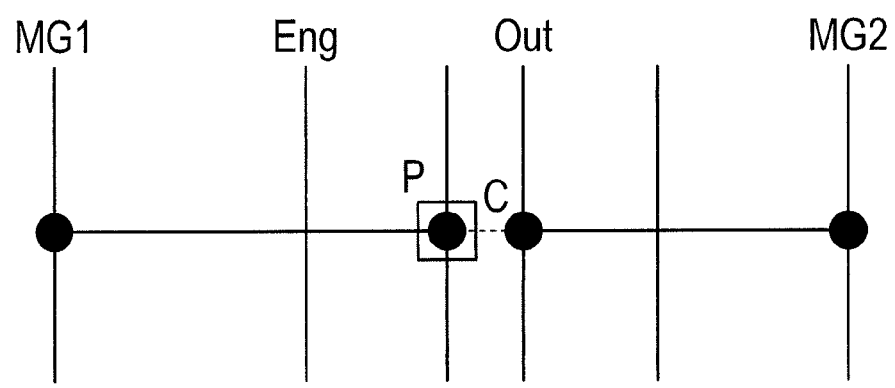
FIG. 11F is an alignment chart in a case that the parking mechanism is controlled to change over to the lock state when the drive apparatus is in a state shown in FIG. 11E.
Figure 12:
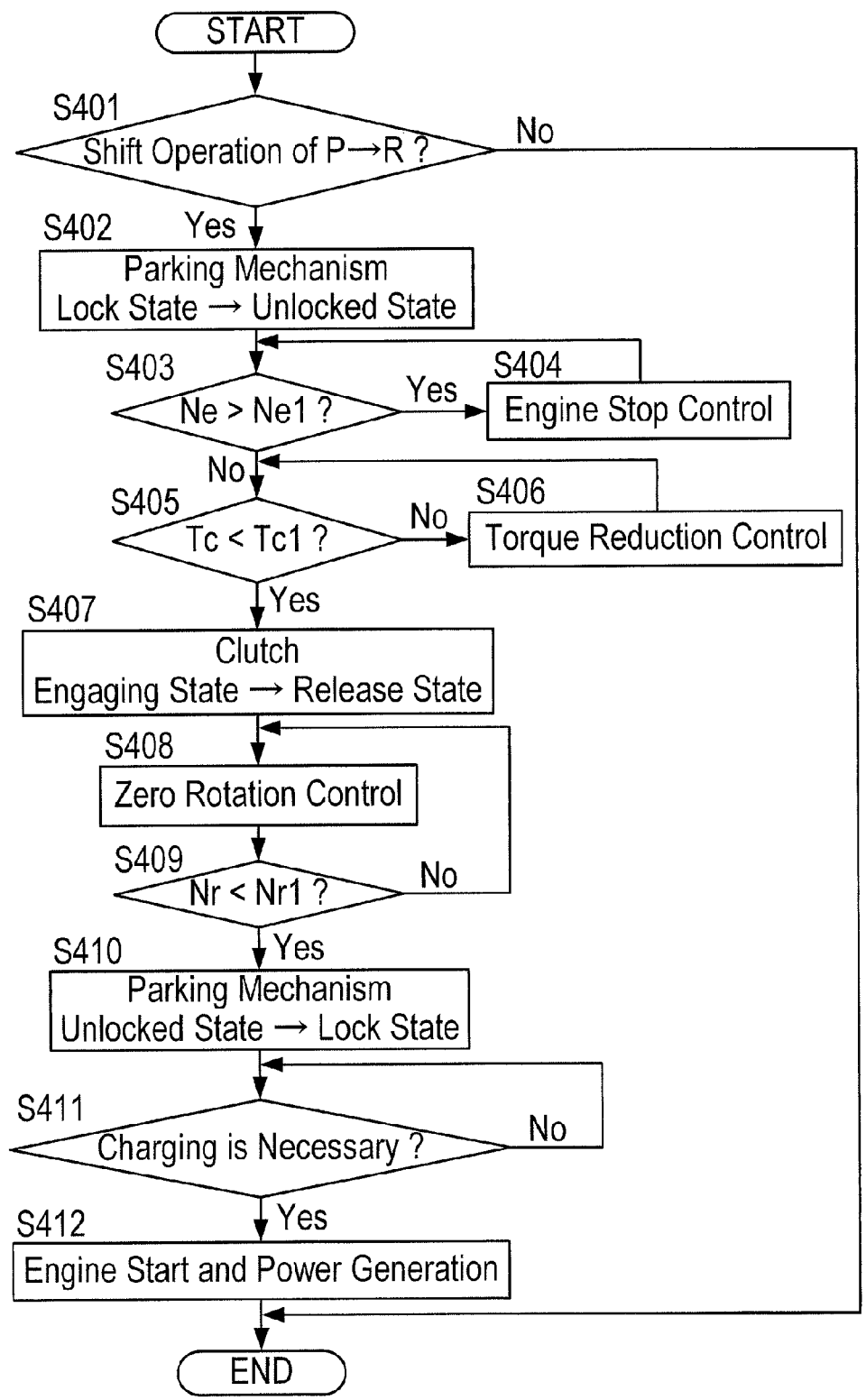
FIG. 12 is a flowchart showing a control routine which is executed in a case that the reverse position is selected as the shift operation when the parking position is in a state of selection.

In the step S307, the ECU 40 controls the clutch 31 so that the state of the clutch 31 is switched from the release state to the engaging state. Thereby, as shown in FIG. 11E, the hollow shaft 25 and the output shaft 4 become in a state where the hollow shaft 25 and the output shaft 4 rotate integrally with each other.

In the step S308, the ECU 40 defers the processes until the rotating speed Nr of the ring gear Ri becomes less than the predetermined value Nr1. The predetermined value Nr1 is the same as the predetermined value Nr1 in the step S8 of FIG. 6. A case that the control of FIG. 10 is executed is a case that the parking position is selected in a process that the vehicle is parked. Accordingly, by stopping the engine 2 and stopping the drive of the first motor generator 3, the rotating speed Nr1 of the ring gear Ri gets close to zero in the course of events. Thereby, it is unnecessary to execute the above zero rotation control which makes the first motor generator 3 operate actively.

In the step S309, the ECU 40 controls the parking mechanism 30 so that the state of the parking mechanism 30 is switched from the unlocked state to the lock state. Thereby, as shown in FIG. 11E, since the clutch 31 is in the engaging state and the parking mechanism 30 is in the lock state, the drive apparatus 1 is in a lock state so that the vehicle is not made to move by a slope and the like.

(4) the Case of "P→R" (FIG. 12 and FIGS. 13A-13G)

This case corresponds to a case that the reverse position R is selected as the shift operation when the parking position P is in a state of selection. A control routine in FIG. 11 is started when the parking position P is in a state of selection.

In the step S401, the ECU 40 determines whether or not the reverse position R is selected as the shift operation when the parking position P is in a state of selection. This determination is performed by the ECU 40 which refers to the shift position signal of the selector 35. When the ECU 40 determines that the reverse position R is selected, the ECU 40 goes to the step S402. On the other hand, the ECU 40 determines that the reverse position R is not selected, the ECU 40 skips subsequent processes and ends the routine of this time.

In the step S402, the ECU 40 controls the parking mechanism 30 so that the state of the parking mechanism 30 is switched from the lock state to the unlocked state. Thereby, the alignment chart of the drive apparatus 1 transitions from a state shown in FIG. 13A to a state shown in FIG. 13B, and the ring gear Ri gets allowed to be free to rotate. When the parking position P is selected, the clutch 31 is controlled to become in the engaging state and the parking mechanism 30 is controlled to become in the lock state. On the other hand, when the reverse position R is selected, the clutch 31 is controlled to become in the release state and the parking mechanism 30 is controlled to become in the lock state. Thereby, in a case that the shift operation is performed for selecting the reverse position R when the parking position P is in a state of selection, it is possible to control the clutch 31 to change over from the engaging state to the release state while the parking mechanism 30 is kept in the lock state without controlling the parking mechanism 30. However, for example, when torque is input to the drive apparatus 1 from the drive wheel Dw side such as a case that the vehicle is parked on the slope inclined backward, the input torque is received by the parking mechanism 30 and the clutch 31. Since the clutch 31 is the dog clutch, engaging force increases as the torque which acts on the clutch 31 increases. Accordingly, the operational power of the clutch 31 for switching the state of the clutch 31 from the engaging state to the release state increases, as the torque which acts on the clutch 31 increases.

When the parking mechanism 30 is controlled to change over from the lock state to the unlocked state in the step S402, the torque which acts on the clutch 31 is released. Accordingly, the operational power required for the operation of the parking mechanism 30 decreases as compared with a case that the clutch 31 is controlled to change over from the engaging state to the release state while the parking mechanism 30 is kept in the lock state. Furthermore, the release operation of the step S402 is performed when the reverse position R is selected, and the engine 2 is running. Thereby, even if the parking mechanism is operated to the unlocked state by selecting the reverse position R in the state where the parking position P has been selected in a situation that the vehicle is parked on the slope inclined backward, there is no possibility that the driver has a feeling of strangeness by releasing the torque which acts on the clutch 31.

In the step S403, the ECU 40 determines whether or not the rotating speed Ne of the engine 2 is greater than the predetermined value Ne1. The rotating speed Ne of the engine 2 is obtained by the ECU 40 which refers to the signal of the crank angle sensor 45. The predetermined value Ne1 uses the same value Ne1 of the routine of the FIG. 6. When the rotating speed Ne of the engine 2 is greater than the predetermined value Ne1, the ECU 40 goes to the step S404 and executes the engine stop control. The engine stop control is continued until it is possible that the rotating speed of the engine 2 is deemed to be zero. By executing the engine stop control, the alignment chart of the drive apparatus 1 transitions from a state shown in FIG. 13B to a state shown in FIG. 13C.

In the step S405, the ECU 40 determines whether or not the torque Tc which acts on the clutch 31 is less than the predetermined value Tc1. The torque Tc is obtained by the ECU 40 which refers to the signal of the torque sensor 48. When the torque Tc is equal to or greater than the predetermined value Tc1, the ECU 40 goes to the step S406 and executes the torque reduction control. The torque reduction control is a control that the torque which acts on the clutch 31 is reduced by controlling the first motor generator 3. The torque reduction control is continued until the torque Tc becomes less than the predetermined value Tc1. The predetermined value Tc1 is the same value Tc1 which is used in the control routine of the FIG. 6.

In the step S407, the ECU 40 controls the clutch 31 so that the state of the clutch 31 is switched from the engaging state to the release state. This control is executed after the torque reduction control of the step S406 is executed. Accordingly, the operational power of the clutch 31 is reduced as compared with a case that the torque reduction control is not executed. By controlling the clutch 31 from the engaging state to the release state, a alignment chart of the drive apparatus 1 transitions from a state shown in FIG. 13C to a state shown in FIG. 13D and the power transmission is shut off by the clutch 31.

In the step S408, the ECU 40 executes the zero rotation control that the rotating speed Nr of the ring gear Ri of the power split mechanism 6 is reduced so as to get close to zero by controlling the first motor generator 3. A calculation method of the rotating speed Nr of the ring gear Ri and a method of the zero rotation control are the same as the methods of the control routine of the FIG. 6.

Figure 13A:
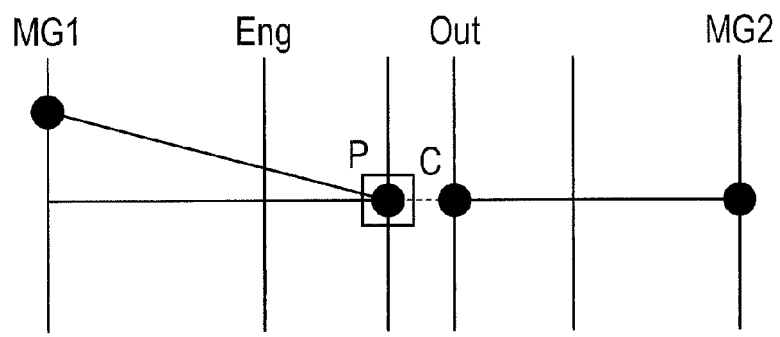
FIG. 13A is an alignment chart of the drive apparatus when the parking position is selected.
Figure 13B:
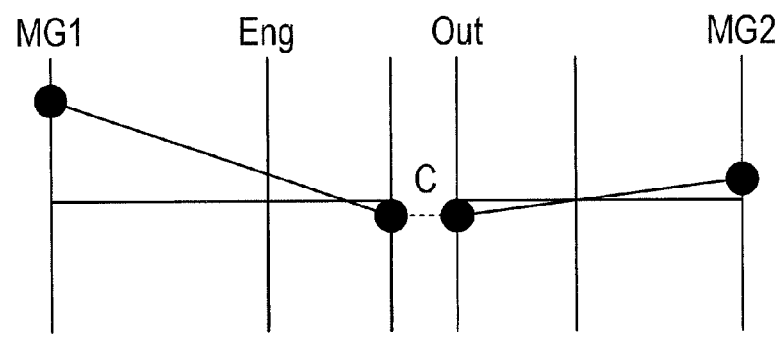
FIG. 13B is an alignment chart in a case that the parking mechanism is controlled to change over to the unlocked state when the drive apparatus is in a state shown in FIG. 13A.
Figure 13C:
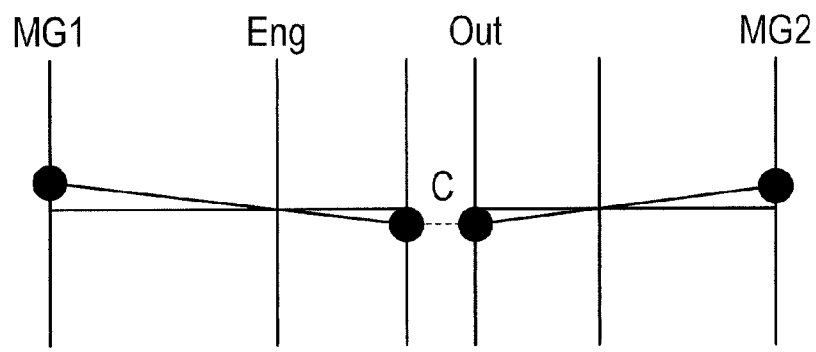
FIG. 13C is an alignment chart in a case that the engine stop control is executed when the drive apparatus is in a state shown in FIG. 13B.
Figure 13D:
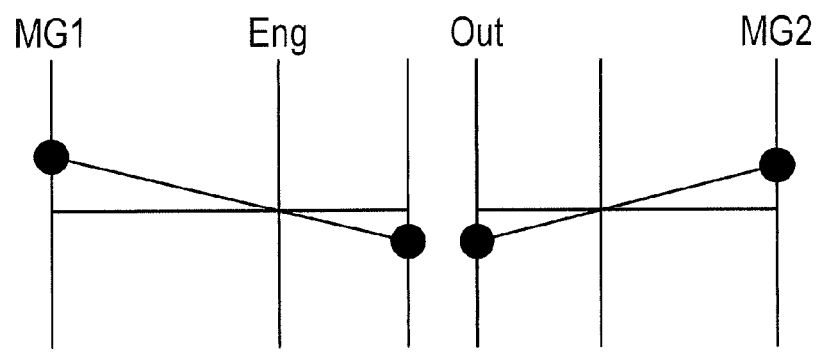
FIG. 13D is an alignment chart in a case that the clutch is controlled to change over to the release state when the drive apparatus is in a state shown in FIG. 13C.
Figure 13E:
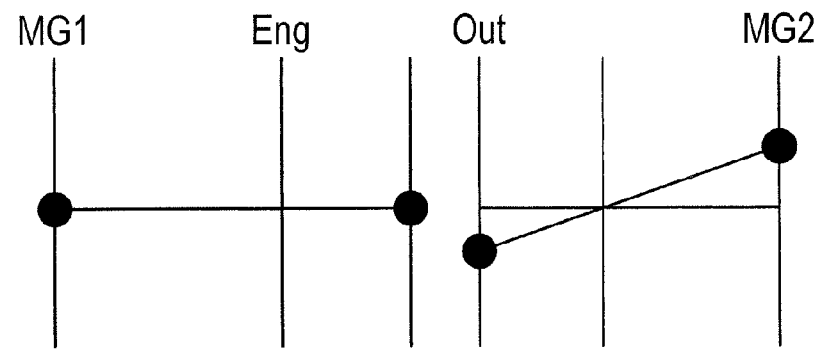
FIG. 13E is an alignment chart in a case that the zero rotation control is executed when the drive apparatus is in a state shown in FIG. 13D.

In the step S409, the ECU 40 determines whether or not the rotating speed Nr of the ring gear Ri is less than the predetermined value Nr1. The predetermined value Nr1 is the same value Nr1 which is used in the control routine of the FIG. 6. When the rotating speed Nr is equal to or greater than the predetermined value Nr1, the ECU 40 returns to the step S408 and continues the zero rotation control until the rotating speed Nr becomes less than the predetermined value Nr1. Thereby, as shown in FIG. 13E, the rotating speed of the ring gear Ri gets close to zero.

Figure 13F:
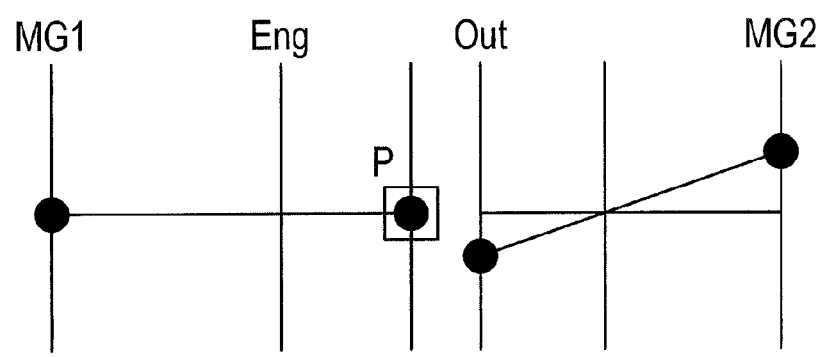
FIG. 13F is an alignment chart in a case that the parking mechanism is controlled to change over to the lock state when the drive apparatus is in a state shown in FIG. 13E.

In the step S410, the ECU 40 controls the parking mechanism 30 so that the state of the parking mechanism 30 is switched from the unlocked state to the lock state. Thereby, as shown in FIG. 13F, the ring gear Ri becomes in a state where the rotation thereof is not allowed. That is, the rotating speed of the ring gear Ri is fixed to zero. As a result, the drive mode is switched from the series-parallel hybrid mode to the series hybrid mode, and it is possible to drive the vehicle in reverse by driving the second motor generator 5.

In the step S411, the ECU 40 obtains the state of charge of the battery by referring to the signal of the SOC sensor 49 and determines whether or not the current state of charge is the state where it is necessary to make the first motor generator 3 generate electrical power. When it is necessary to charge the battery, the ECU 40 goes to the step S412. When it is not necessary to charge the battery, the ECU 40 defers the processes.

Figure 13G:
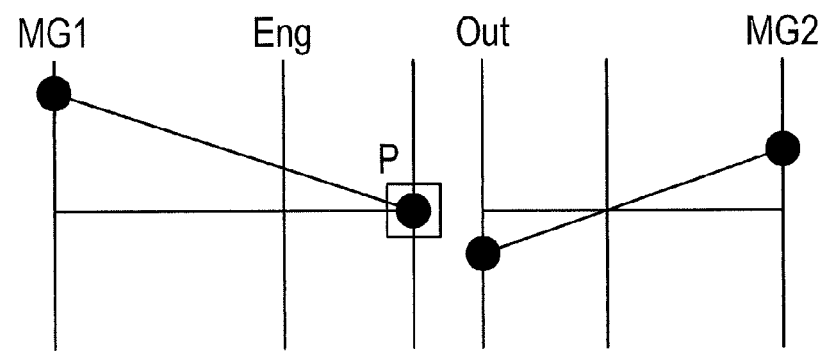
FIG. 13G is an alignment chart in a case that the engine is restarted and the power generation is performed when the drive apparatus is in a state shown in FIG. 13E.

In the step S412, the ECU 40 restarts the engine 2 which was stopped in the step S404. And, as shown in FIG. 13G, the ECU 40 drives the first motor generator 3 by using the power of the engine 2 which is restarted, and makes the first motor generator 3 generate the electrical power. The power of the engine 2 is converted to the electrical power by the electrical generation of the first motor generator 3, and the electrical power is used to charge the battery and is supplied to the second motor generator 5.

(A Selection of the Neutral Position N)

Next, in addition to the above embodiments of the switching of the shift position, a case that the shift position is switched to the neutral position from each of the parking position, the reverse position, the neutral position, and the drive position will be described. In this case, the ECU 40 detects a selection of the neutral position based on the shift position signal of the selector 35. And, the ECU 40 defers the execution of the engine stop control even though the engine is running, and keeps the state of the parking mechanism 30 and the state of the clutch 31 in the states that correspond to the shift position selected before the neutral position. According to this control, a control pattern is simplified as compared with a case that each of the states of the parking mechanism 30 and the clutch 31 which corresponds to the neutral position is set independently.

In the above embodiment, the ECU 40 functions as a rotating speed control device and a shift control device according to the present invention by executing the control routines of FIG. 6, FIG. 8, FIG. 10, or FIG. 12. The present invention is not limited to the above embodiment, and various changes and modifications can be made within a range of the scope of the present invention. In the above embodiment, as the lock mechanism according to the present invention, the parking mechanism which is configured so that the parking pole is engaged with the parking gear is used. However, various mechanisms which are able to lock a rotation element so as not to rotate may be used as the lock mechanism. For example, a meshing type brake or a friction type brake may be used as the lock mechanism according to the present invention. Furthermore, the clutch is also applied to the present invention in a similar way to the lock mechanism. That is, not only the dog clutch of the above embodiment, but also a friction type and other type clutches may be used as the clutches according to the present invention. In the synchronization control and the zero rotation control, the effects that the operating noises of the meshing type clutch and the lock mechanism are suppressed are likely to be shown. However, even if the other type clutch and lock mechanism are used, it is possible to suppress the operating noises by executing the synchronization control and the zero rotation control.

In the above embodiment, the parking position, the reverse position, the neutral position, and the drive position are set as the plural shift positions. However, it is possible to add other shift position in addition to these shift positions. That is, any shift position can be applied, as long as selecting a particular shift position is one of necessary conditions for making the lock mechanism and the clutch operate.

In the above embodiment, the single pinion type planetary gear mechanism is used as the power split mechanism according to the present invention. However, a double pinion type planetary gear mechanism may be used as the power split mechanism according to the present invention. Furthermore, as the power split mechanism, for example, a planetary roller mechanism which has friction wheels (rollers) as the rotational elements instead of gears may be used.

The invention claimed is:

1. A drive apparatus for a hybrid vehicle, the drive apparatus including:
   an engine;
   a first motor generator;
   an output shaft for outputting drive power from drive wheels of the vehicle;
   a second motor generator which transmits power to the output shaft;
   a power split mechanism having a first rotational element, a second rotational element, and a third rotational element which are capable of differentially rotating with each other, the first rotational element being connected to the engine, and the second rotational element being connected to the first motor generator;
   a clutch operating between an engaging state where the third rotational element of the power split mechanism and the output shaft are connected with each other and a release state where the third rotational element and the output shaft are separated from each other;
   a lock mechanism operating between a lock state where the third rotational element of the power split mechanism is locked so as not to rotate and an unlocked state where the third rotational element locked is released; and
   an electronic control unit controlling the engine, the first motor generator, the second motor generator, the clutch, and the lock mechanism, wherein
   the electronic control unit is programmed so as to include rotating speed control programming instructions that are executed to control a rotating speed of the third rotational element before a control to the clutch or the lock mechanism is performed, and
   the rotating speed control programming instructions are executed to control the rotating speed of the third rotational element by controlling the first motor generator after a rotating speed of the engine is deemed to be zero by executing an engine stop control for stopping the engine, when a condition which the control to the clutch or the lock mechanism is performed is satisfied while the engine is running.

2. The drive apparatus according to claim 1, further including
   a shift position selection device where plural shift positions including a parking position, a reverse position, a neutral position, and a drive position are set, the shift position selection device receiving a shift operation for selecting each shift position of the plural shift positions by a driver, and
   the electronic control unit is further programmed so as to include shift control programming instructions that are executed to: control the lock mechanism to go into the lock state and control the clutch to go into the engaging state when the shift position selection device receives the shift operation for selecting the parking position; control the lock mechanism to go into the lock state and control the clutch to go into the release state when the shift position selection device receives the shift operation for selecting the reverse position; and control the lock mechanism to go into the unlocked state and control the clutch to go into the engaging state when the shift position selection device receives the shift operation for selecting the drive position.

3. The drive apparatus according to claim 2, wherein
   in a case that the reverse position is selected as the shift operation when the drive position or the parking position is in a state of selection while the engine is running,
   the rotating speed control programming instructions are executed to determine that the condition is satisfied and execute a zero rotation control for reducing a rotating speed of the third rotational element so as to get close to zero by controlling the first motor generator after the rotating speed of the engine is deemed to be zero by executing the engine stop control, and
   the shift control programming instructions are executed to control the lock mechanism to go into the lock state from the unlocked state, after the zero rotation control is ended.

4. The drive apparatus according to claim 2, wherein
   in a case that the drive position or the parking position is selected as the shift operation when the reverse position is in a state of selection while the engine is running,
   the rotating speed control programming instructions are executed to determine that the condition is satisfied and execute a synchronization control for limiting a difference of rotating speed between elements which are connected with each other by the clutch within an allowable range by controlling the first motor generator after the rotating speed of the engine is deemed to be zero by executing the engine stop control, and
   the shift control programming instructions are executed to control the clutch to go into the engaging state from the release state, after the synchronization control is ended.

5. The drive apparatus according to claim 2, wherein
   the clutch is configured as a dog clutch, and
   in a case that the reverse position is selected as the shift operation when the parking position is in a state of selection while the engine is running, the shift control programming instructions are executed to control the lock mechanism to go into the unlocked state from the lock state before the engine stop control by the rotating speed control programming instructions.

6. The drive apparatus according to claim 2, wherein
in a case that the neutral position is selected as the shift operation,
the rotating speed control programming instructions are executed to defer an execution of the engine stop control even though the engine is running, and
the shift control programming instructions are executed to keep a state of each of the lock mechanism and the clutch in a state corresponding to the shift position set before the neutral position selected.

7. The drive apparatus according to claim 1, wherein
the clutch is configured as a dog clutch, and
the shift control programming instructions are executed to execute a torque reduction control for reducing torque which acts on the clutch by controlling the first motor generator before controlling the clutch to go into the release state from the engaging state.

* * * * *